US012714275B2

(12) United States Patent
Hoobler et al.

(10) Patent No.: US 12,714,275 B2
(45) Date of Patent: Aug. 25, 2026

(54) PAD CLEANING SYSTEM FOR ROBOTIC VACUUM CLEANERS

(71) Applicant: iRobot Corporation, Bedford, MA (US)

(72) Inventors: Rick Hoobler, Waltham, MA (US); Jason Jeffrey Suchman, Arlington, MA (US); Peter J. Lydon, Peabody, MA (US); Guo hui Pan, Dong guan (CN); Gary Cui, Guangzhou (CN)

(73) Assignee: iRobot Corporation, Bedford, MA (US)

( * ) Notice: Subject to any disclaimer, the term of this patent is extended or adjusted under 35 U.S.C. 154(b) by 308 days.

(21) Appl. No.: 17/748,361

(22) Filed: May 19, 2022

(65) Prior Publication Data

US 2022/0400925 A1 Dec. 22, 2022

Related U.S. Application Data

(60) Provisional application No. 63/213,406, filed on Jun. 22, 2021.

(51) Int. Cl.
*A47L 9/28* (2006.01)
*A47L 9/14* (2006.01)
(Continued)

(52) U.S. Cl.
CPC ............. *A47L 9/2873* (2013.01); *A47L 9/149* (2013.01); *B08B 1/165* (2024.01); *B08B 1/30* (2024.01);
(Continued)

(58) Field of Classification Search
CPC ........ B08B 2203/027; B08B 2203/007; B08B 3/08; B08B 3/02; B08B 1/165;
(Continued)

(56) References Cited

U.S. PATENT DOCUMENTS 7,891,387 B2 * 2/2011 Lim ...................... A47L 9/2852 141/94
9,462,920 B1 * 10/2016 Morin ................. A47L 11/4025
(Continued)

FOREIGN PATENT DOCUMENTS

CA 3123772 A1 12/2019
CN 211749314 U * 10/2020
(Continued)

OTHER PUBLICATIONS

"International Application Serial No. PCT US2022 030007, International Preliminary Report on Patentability mailed Jan. 4, 2024", 12 pgs.
(Continued)

*Primary Examiner* — Katina N. Henson
(74) *Attorney, Agent, or Firm* — Maschoff Brennan

(57) ABSTRACT

A docking station for a mobile cleaning robot can include a base portion configured to receive the mobile cleaning robot. The docking station can include a housing connected to the base portion and a pad cleaning system. The pad cleaning system can be connected to the housing and can include a cleaning head engageable with a cleaning pad of the mobile cleaning robot to remove debris from the cleaning pad, the cleaning head can include a nozzle configured to discharge a fluid onto the cleaning pad.

19 Claims, 15 Drawing Sheets

(51) Int. Cl.
*B08B 1/16* (2024.01)
*B08B 1/30* (2024.01)
*B08B 3/02* (2006.01)
*B08B 3/08* (2006.01)

(52) U.S. Cl.
CPC .................. *B08B 3/02* (2013.01); *B08B 3/08* (2013.01); *A47L 2201/022* (2013.01); *A47L 2201/024* (2013.01); *A47L 2201/028* (2013.01); *B08B 2203/007* (2013.01); *B08B 2203/027* (2013.01)

(58) Field of Classification Search
CPC ................. B08B 1/30; A47L 2201/028; A47L 2201/024; A47L 9/149; A47L 9/2873
USPC ................................................................ 15/4
See application file for complete search history.

(56) References Cited

U.S. PATENT DOCUMENTS

| | | | | |
|---|---|---|---|---|
| 10,786,129 | B1 * | 9/2020 | Ebrahimi Afrouzi | A47L 9/2873 |
| 10,986,971 | B1 * | 4/2021 | Ebrahimi Afrouzi | B60L 53/18 |
| 2018/0116478 | A1 | 5/2018 | Lewis et al. | |
| 2020/0000305 | A1 * | 1/2020 | Fox | A47L 11/28 |
| 2021/0369072 | A1 | 12/2021 | Gao | |
| 2024/0260807 | A1 | 8/2024 | Ohm et al. | |

FOREIGN PATENT DOCUMENTS

| | | | | |
|---|---|---|---|---|
| CN | 112869673 | | 6/2021 | |
| CN | 112869673 | A * | 6/2021 | A47L 11/00 |
| CN | 218832686 | | 4/2023 | |
| EP | 2436296 | A1 | 4/2012 | |
| EP | 3669738 | A1 | 6/2020 | |
| WO | 2018108144 | | 6/2018 | |
| WO | WO-2018108144 | A1 * | 6/2018 | A47L 11/24 |
| WO | WO-2024167703 | A1 | 8/2024 | |

OTHER PUBLICATIONS

"International Application Serial No. PCT US2022 030007, Invitation to Pay Additional Fees mailed Sep. 13, 2022", 13 pgs.
"International Application Serial No. PCT US2022 030007, International Search Report mailed Nov. 4, 2022", 6 pgs.
"International Application Serial No. PCT US2022 030007, Written Opinion mailed Nov. 4, 2022", 10 pgs.
"Hoober, Rick, et al., Two in one Mobile Cleaning Robot, U.S. Appl. No. 63/088,544, filed Oct. 7, 2020", 45 pgs.
"European Application Serial No. 22729961.7, Response filed Jul. 30, 2024 to Communication pursuant to Rules 161(1) and 162 EP", w/ claims, 16 pgs.
"International Application Serial No. PCT/US2024/013357, International Search Report mailed May 7, 2024", 3 pgs.
"International Application Serial No. PCT/US2024/013357, Written Opinion mailed May 7, 2024", 7 pgs.
"U.S. Appl. No. 18/106,078, Restriction Requirement mailed Jun. 2, 2025", 6 pgs.
"U.S. Appl. No. 18/106,078, Response filed Aug. 4, 2025 to Restriction Requirement mailed Jun. 2, 2025", 8 pgs.
"European Application Serial No. 22729961.7, Communication Pursuant to Article 94(3) EPC mailed Sep. 19, 2025", 4 pgs.
"International Application Serial No. PCT/US2024/013357, International Preliminary Report on Patentability mailed Aug. 21, 2025", 9 pgs.
"U.S. Appl. No. 18/106,078, Non Final Office Action mailed Jan. 28, 2026", 8 pgs.
"European Application Serial No. 22729961.7, Response filed Jan. 5, 2026 to Communication Pursuant to Article 94(3) EPC mailed Sep. 19, 2025", 57 pgs.

* cited by examiner

PAD CLEANING SYSTEM FOR ROBOTIC VACUUM CLEANERS

CLAIM OF PRIORITY

This patent application claims the benefit of priority, under 35 U.S.C. Section 119(e), to Rick Hoobler, U.S. Patent Application Ser. No. 63/213,406, entitled "PAD CLEANING SYSTEM FOR ROBOTIC VACUUM CLEANERS," filed on Jun. 22, 2021, which is hereby incorporated by reference herein in its entirety.

BACKGROUND

Autonomous mobile robots include autonomous mobile cleaning robots that can autonomously perform cleaning tasks within an environment, such as a home. Many kinds of cleaning robots are autonomous to some degree and in different ways. Some robots can perform vacuuming operations and some can perform mopping operations. Other robots can include components or systems to perform both vacuuming and mopping operations.

SUMMARY

Some autonomous cleaning robots can include both a vacuum system and a mopping system that can allow the robots to perform both mopping and vacuuming operations (such as simultaneously or alternatively), often referred to as two-in-one robots or vacuums. Some two-in-one robots include a pad type mopping system located rearward of a vacuum extractor that allows the robot to extract debris from a floor surface just prior to mopping the surface with the pad. These systems can be effective for cleaning hard surfaces that may require both debris extraction and mopping. However, use of a pad type mopping system often requires that a cleaning pad be cleaned or replaced one or more times during a cleaning mission, depending on the size of the area to be cleaned and how dirty the area is. While a user can replace or clean the mopping pad of the mobile cleaning robot, a user interfacing with the mobile cleaning robot during missions can increase cleaning times and create more labor for the user.

This disclosure helps to address these issues by providing a mobile cleaning robot and docking station configured to autonomously clean or refresh a mopping pad of the mobile cleaning robot, before, during, or after a mopping mission. For example, the mobile cleaning robot can navigate to the docking station and position a soiled or dirty cleaning pad into the docking station. The docking station can then operate (e.g., autonomously) to spray fluid on the cleaning pad and scrape the cleaning pad to separate debris from the cleaning pad. Such a system can help to reduce user interactions with a mopping robot or a two-in-one mobile cleaning robot, helping to increase robot autonomy.

The above discussion is intended to provide an overview of subject matter of the present patent application. It is not intended to provide an exclusive or exhaustive explanation of the invention. The description below is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1B:
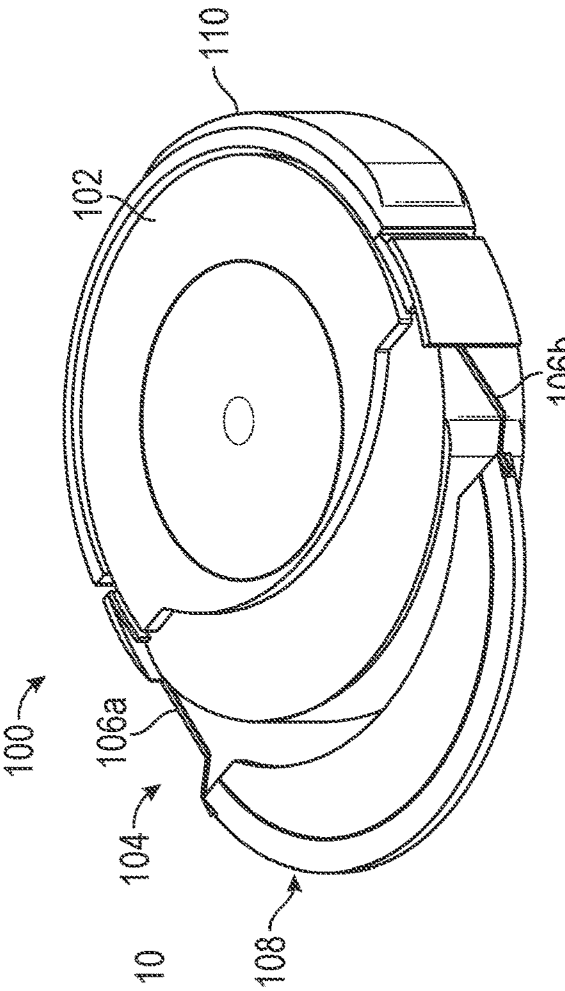
FIG. 1B illustrates an isometric view of a mobile cleaning robot in a second condition.
Figure 1C:
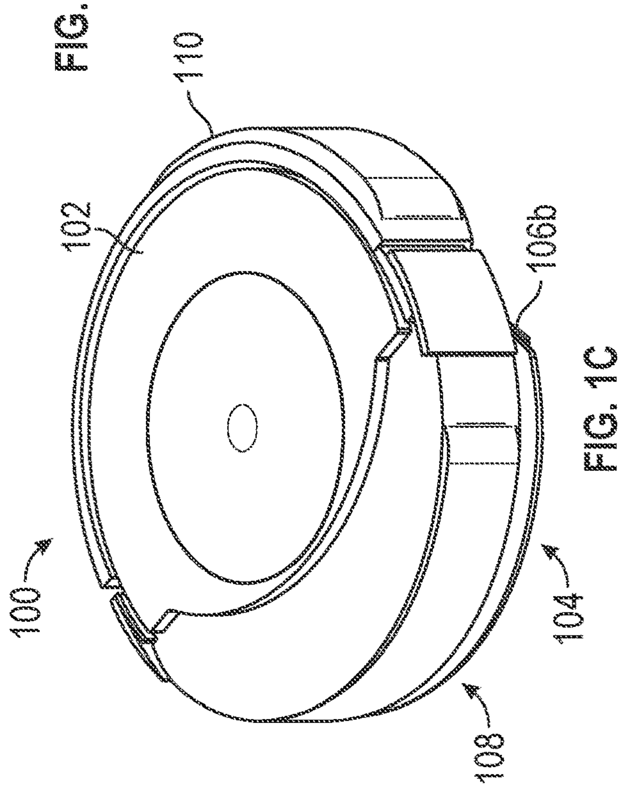
FIG. 1C illustrates an isometric view of a mobile cleaning robot in a third condition.
Figure 1A:
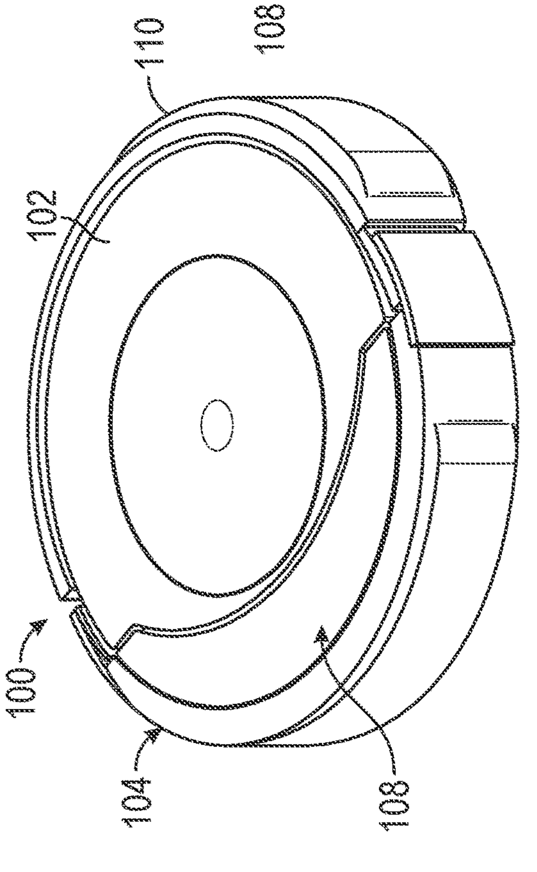
FIG. 1A illustrates an isometric view of a mobile cleaning robot in a first condition.

FIG. 1A illustrates an isometric view of a mobile cleaning robot 100 in a first condition. FIG. 1B illustrates an isometric view of the mobile cleaning robot 100 in a second condition. FIG. 1C illustrates an isometric view of the mobile cleaning robot 100 in a third condition. FIGS. 1A-1C are discussed together below.

The mobile cleaning robot 100 can include a body 102 and a mopping system 104. The mopping system 104 can include arms 106*a* and 106*b* (referred to together as arms 106) and a pad assembly 108. The robot 100 can also include a bumper 110 and other features such as an extractor (including rollers), one or more side brushes, a vacuum system, a controller, a drive system (e.g., motor, geartrain, and wheels), a caster, sensors, or the like, as shown in U.S.

Patent Application Ser. No. 63/088,544, entitled "Two In One Mobile Cleaning Robot," filed on Oct. 7, 2020, to Michael G. Sack, which is incorporated by reference herein in its entirety. A proximal portion of the arms 106*a* and 106*b* can be connected to an internal drive system (such as shown and discussed in U.S. Patent Application Ser. No. 63/088,544). A distal portion of the arms 106 can be connected to the pad assembly 108.

In operation of some examples, the robot 100 can operate the arms 106 to move the pad assembly 108 between a stored position (shown in FIG. 1A), an extended position (shown in FIG. 1B), and an operating or cleaning position (shown in FIG. 1C). In the stored position, the robot 100 can perform vacuuming operations only. In the operating position, the robot 100 can perform wet or dry mopping operations and vacuuming operations or can perform only mopping operations. In the extended position (or other positions), the robot 100 can clean a pad of the pad assembly 108, as discussed in further detail below.

Figure 2:
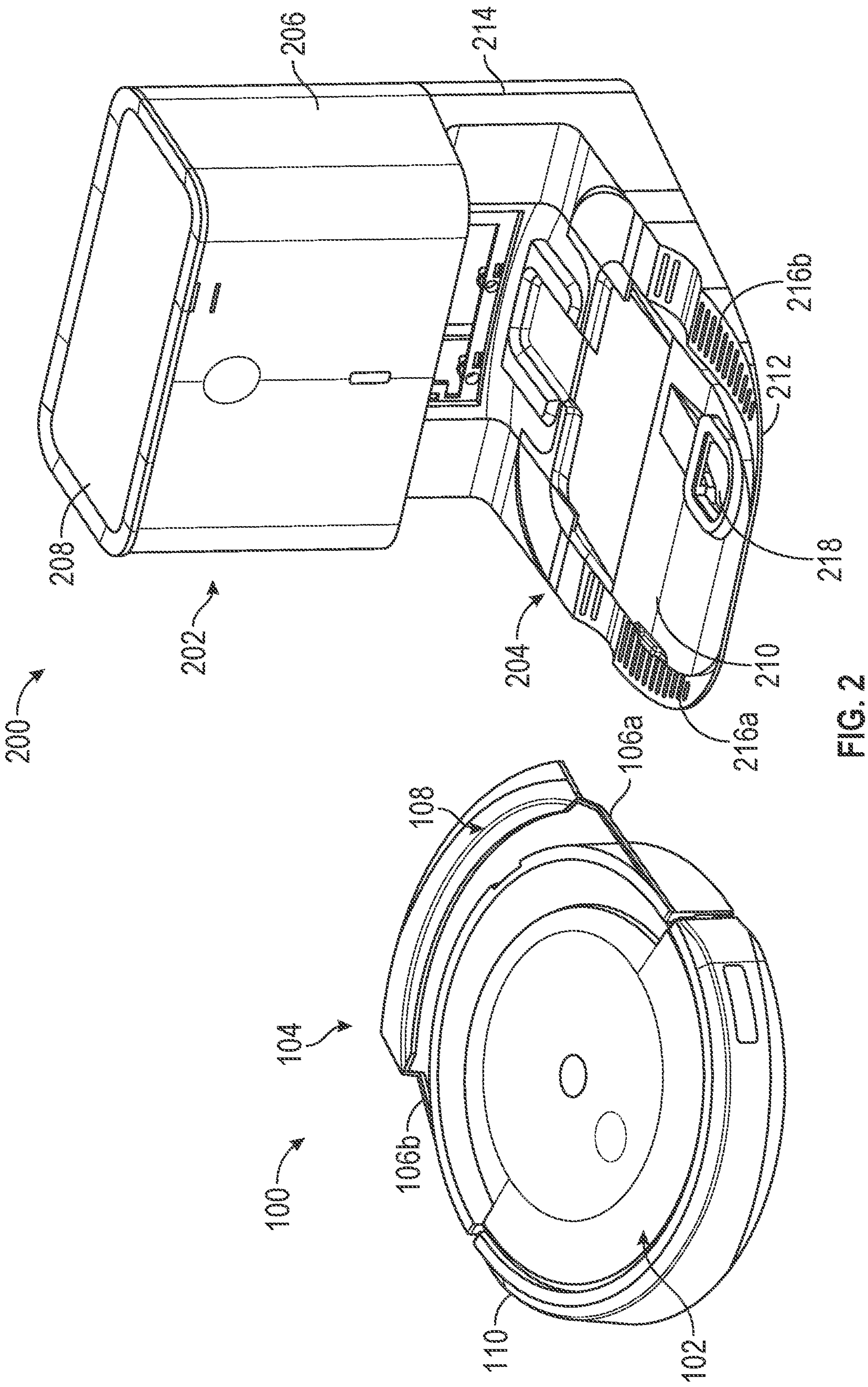
FIG. 2 illustrates an isometric view of a mobile cleaning robot and docking station.

FIG. 2 illustrates an isometric view of the mobile cleaning robot 100 and docking station 200. The docking station 200 can include a canister 202 and a base 204. The canister 202 can include an outer wall 206 and a lid 208. The base 204 can include a platform 210 having a front portion 212 and a rear portion 214. The base 204 can also include tracks 216*a* and 216*b* and a vacuum port 218.

The components of the docking station 200 can be rigid or semi-rigid components made of materials such as one or more of metals, plastics, foams, elastomers, ceramics, composites, combinations thereof, or the like. Materials of some components are discussed in further detail below. The base 204 can be a ramped member including the platform 210 and the tracks 216*a* and 216*b*, which can be configured to receive the mobile cleaning robot 100 thereon for maintenance, such as charging and emptying debris from the mobile cleaning robot. The tracks 216 can be configured to receive wheels of the robot 201 to guide the robot 201 onto the base 204 for charging and debris evacuation. The front portion 212 can be opposite the back portion 214, which can connect to the canister 202. The platform 210 and the tracks 216 can be sloped toward the front portion 212 to help allow the mobile robot 100 to dock on the station 200.

When the robot 100 is positioned on the base 204, such as when wheels of the robot 100 are in wheel wells of the tracks, the vacuum port 218 can be aligned with a vacuum outlet of the robot 100. The canister 202 can be an upper portion of the docking station 200 connected to the rear portion 214 of the base 204 and can extend upward therefrom. The outer wall 206 of the canister 202 can have a shape of a substantially rectangular hollow prism with rounded corners where the outer wall 206 can define a top portion of the canister 202 that is open.

The lid 208 can be connected to the outer wall 206 (such as by hinges or other fasteners), such as at a rear portion of the lid 208. The lid 208 can be releasably securable to the outer wall 206, such as at a front portion of the lid 208 and the outer wall 206 (such as via a friction/interference fit, latch, or the like). Removal of the lid 208 or opening of the lid 208 from the top portion of the canister 202 can provide access to both a fan compartment and a debris bin. Any of the docking stations discussed below can include the features of the docking station 200.

Figure 3B:
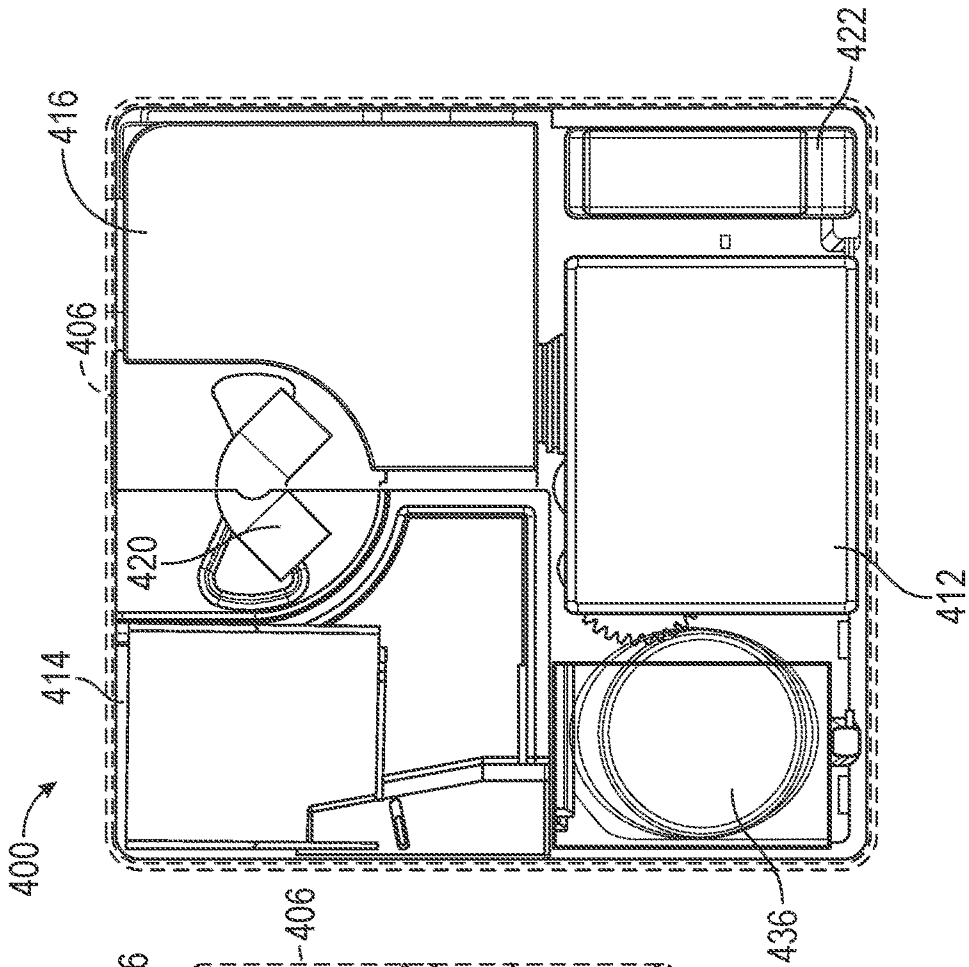
FIG. 3B illustrates a top view of a mobile cleaning robot and docking station.
Figure 3A:
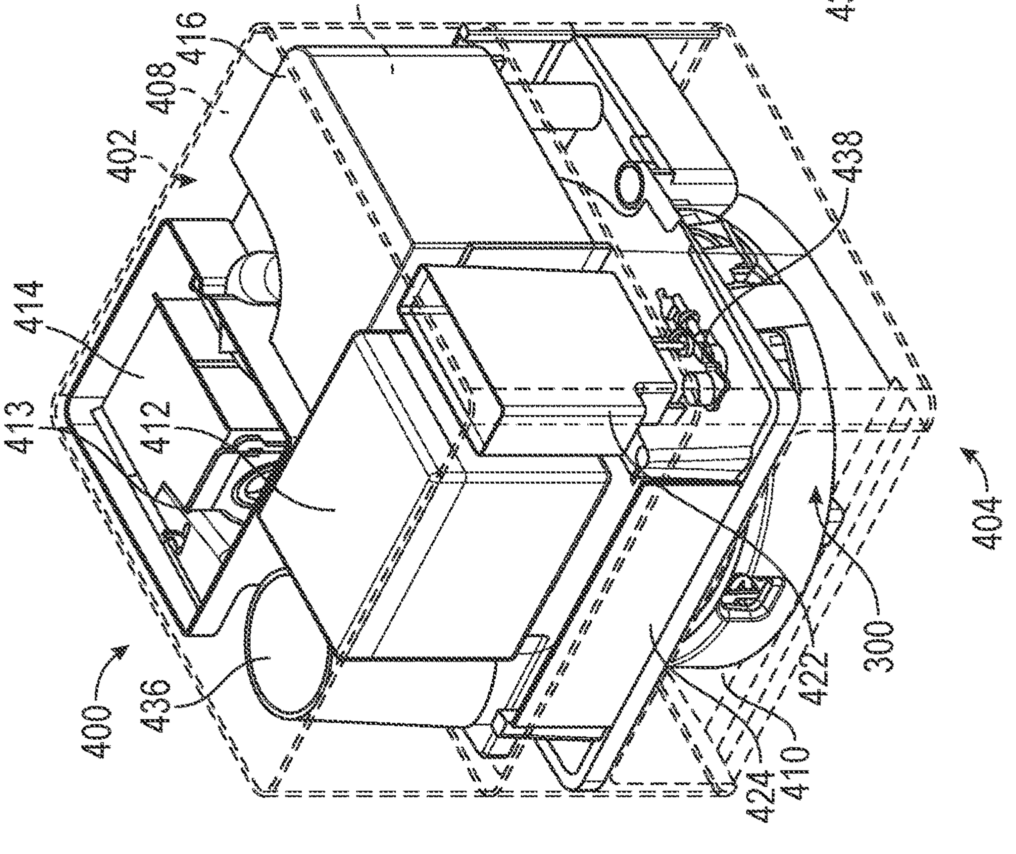
FIG. 3A illustrates an isometric view of a mobile cleaning robot and docking station.
Figure 3D:
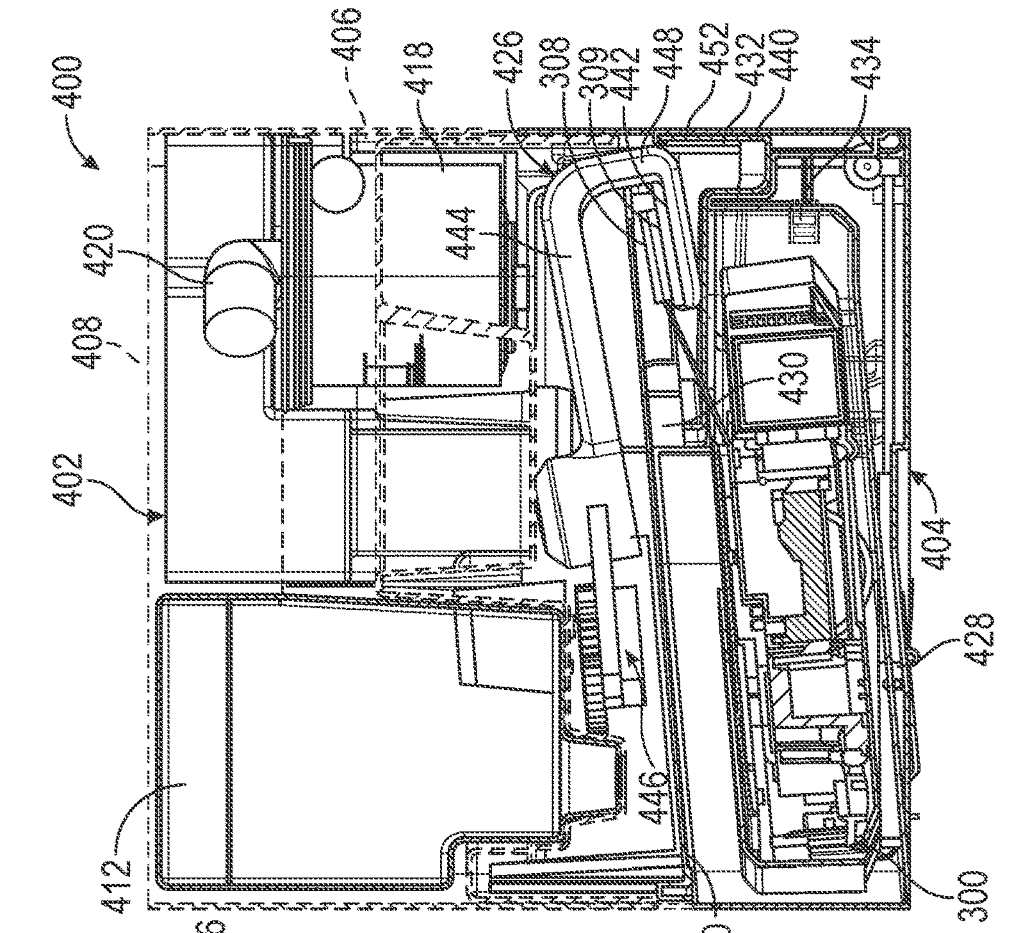
FIG. 3D illustrates a side cross-sectional view of a mobile cleaning robot and docking station.
Figure 3C:
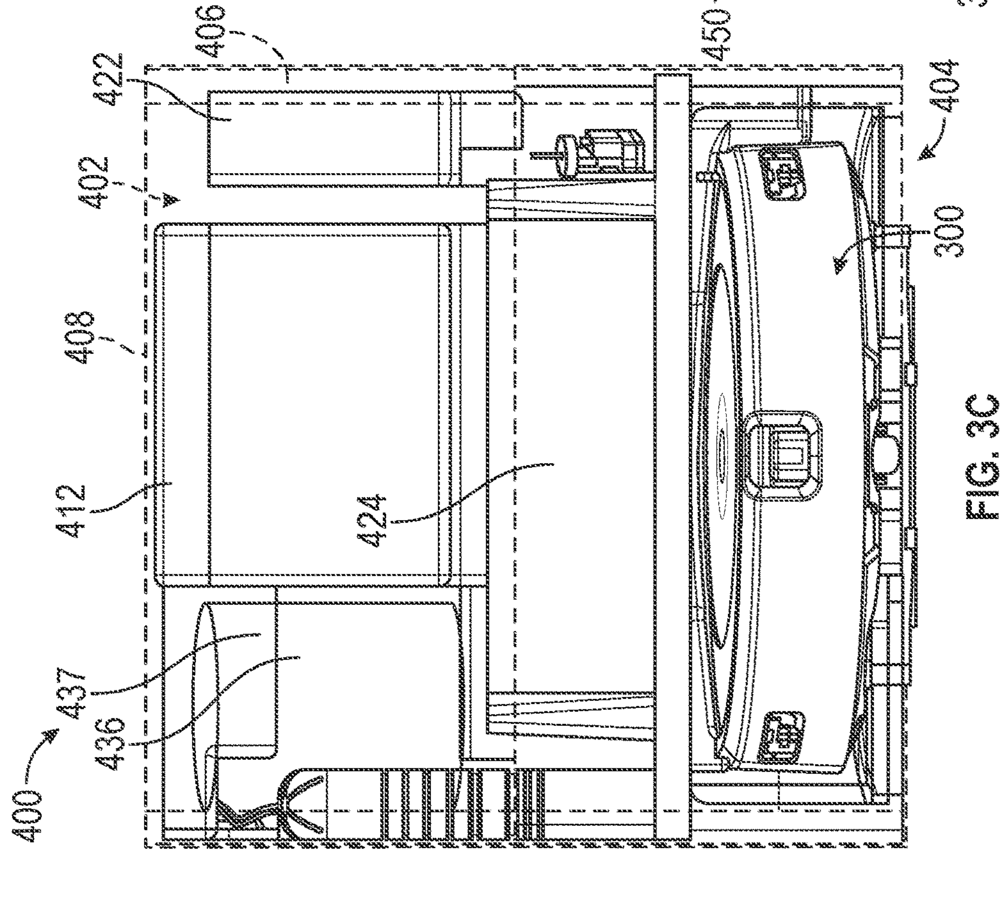
FIG. 3C illustrates a front view of a mobile cleaning robot and docking station.

FIG. 3A illustrates an isometric view of a mobile cleaning robot 300 and a docking station 400. FIG. 3B illustrates a top view of the mobile cleaning robot 300 and the docking station 400. FIG. 3C illustrates a front view of the mobile cleaning 300 robot and the docking station 400. FIG. 3D illustrates a side cross-sectional view of the mobile cleaning robot 300 and the docking station 400. FIGS. 3A-3D are discussed together below. The robot 300 and docking station 400 can be similar to those discussed above or below where like numerals can represent like components. The docking station 400 can differ in that the docking station 400 can include a pad washing station; any of the docking stations discussed above or below can be modified to include such a pad washing system or station.

The docking station 400 can include a housing 402 and a base 404. The housing 402 can include an outer wall 406 and a lid 408. The base 404 can include a platform 410. The docking station 400 can also include a water tank 412, a vacuum or debris bag 413, an evacuation system 414, a dirty water tank 416 (or waste tank), an evacuation fan 418, a vacuum suction diverter valve 420, a detergent tank 422, a controller 424, a pad cleaning system 426, a charging sled 428 (shown in FIG. 3D), an evacuation duct 430, a pad cleaning tray 432, a docking sensor 434, a water pump 436, a detergent pump 438, and a turbidity sensor 440.

The water tank 412 can be located at least partially within the housing 402 and can be configured to store water or fluid therein. The evacuation system 414 can be connectable to the robot 300 through the evacuation duct 430 and can be configured to receive and store the evacuation bag 413 therein. The evacuation fan 418 can be connected to the dirty water tank 416, which can be configured to receive and store dirty water, such as from the robot 300 or the pad cleaning system 426 therein.

The evacuation fan 418 can be connected to the vacuum suction diverter valve 420 and to the evacuation system 414. The evacuation fan 418 can be operable to draw or extract debris (and optionally fluid) from a debris bin of the mobile cleaning robot 300 or from the cleaning tray 432. Debris can be routed to the debris bag 413. The vacuum suction diverter valve 420 can optionally divert flow of debris or fluids to the evacuation system 414 or the dirty water tank 416, such as depending on the mode of operation used by the robot 300 or by a sensor (such as in the evacuation duct 430) where the sensor is in communication with the controller 424 and where the controller 424 can operate the vacuum suction diverter valve 420. Dirty fluid (such as from the cleaning tray 432) can be routed to the dirty water tank 416.

The detergent tank (or cleaning agent tank) 422 can be located at least partially within the housing 402 and can be configured to store detergent or a cleaning agent therein. Optionally, the detergent or cleaning agent can include an antimicrobial agent or an antiviral agent. The detergent can be optionally mixed with water by the detergent pump 438 for delivery to the cleaning system 426 or the tray 432. The detergent or cleaning agent can also be optionally routed to a tank 333 of the robot 300 for refilling of the tank. The water pump 436 can be connected to the water tank 412 and can be operated (e.g., by the controller 424) to pump water from the water tank 412 and to the cleaning system 426 or the tray 432. Optionally, the water pump 436 can pump water to the detergent pump 438. A heater 437 can optionally be connected to the pump 436 or the storage tank 412 and can be configured to heat the water within the storage tank.

The controller 424 can be a programable controller, such as a single or multi-board computer, a direct digital controller (DDC), a programable logic controller (PLC), or the like. In other examples the controller 424 can be any computing device, such as a handheld computer, for example, a smart phone, a tablet, a laptop, a desktop computer, or any other computing device including a processor, memory, and communication capabilities.

The pad cleaning system 426 can be located at least partially within the housing or connected to the housing 402 and can include a cleaning head 442, an arm 444, and a gear train 446. The cleaning head 442 can be connected to the arm 444 such as by a curved portion 448 that extends around a divider 450 of the housing 402. The cleaning head 442 can be engageable with a cleaning pad of the mobile cleaning robot 300 to remove debris from the cleaning pad. The cleaning head 442 can include a nozzle configured to discharge a fluid (from the water tank 412 or the detergent tank 422) onto the cleaning pad. The arm 444 can be connected to the gear train 446, which can control movement of the arm 444 and therefore the cleaning head 442. The gear train 446 can be driven to operate by a motor, as discussed below.

The pad cleaning tray 432 can be located at least partially within the housing 402 and can be removable through a door 452 of the housing 402, such as to clean the tray 432 and clean or service other components of the fluidic and cleaning systems. The tray 432 can be positioned under the cleaning head 442 to catch water, fluid, or debris falling therefrom. The tray 432 can optionally be configured (e.g., sized or shaped) to receive a cleaning pad of the robot 300 therein, such as for soaking of the pad in fluid in the tray 432.

The docking sensor 434 can be an infrared sensor, optical sensor, or the like. The docking sensor 434 can be connected to the tray 432 or located near the tray, such as to detect a condition of fluid within the tray 432. The detergent pump 438 can be connected to the detergent tank 422 and operable to pump detergent from the detergent tank 422 and to the tray 432 or the cleaning head 442. The turbidity sensor 440 can be an optical sensor connected to the tray 432 or located therein to produce a signal based on a condition of fluid within the tray 432. The turbidity sensor 440 can be in communication with the controller 424.

The charging sled 428 (shown in FIG. 3D) can be connected to the base 410 and can include contacts for engaging charging contacts of the robot 300. The charging sled 428 is discussed in further detail below with respect to FIGS. 6A-7.

In operation of some examples, the robot 300 can be navigated (e.g., autonomously) to the docking station 400 where the robot 300 can extend its cleaning tray assembly 308 below the divider 450 and above the tray 432. Optionally, the pump 436 can be operated to pump water (optionally heated by the heater 437) or fluid from the storage tank 412. The water can be optionally pumped to the detergent pump 438, which can be operated to selectively deliver water (or fluid) or detergent from the detergent tank 422 to the cleaning system 426.

The fluid (e.g., water or detergent) can be pumped to the cleaning head 442 or to the tray 432. Optionally, the tray 432 can be filled using the cleaning head 442. Optionally, the tray 432 can be filled, at least partially, with fluid and a cleaning pad 309 of the pad assembly 308 can be positioned to soak in the fluid, such as for 1, 2, 3, 4, 5, 6, 7, 8, 9, 10, 15 minutes, or the like. After soaking, the cleaning head 442 can be operated to engage the mopping pad and to spray fluid onto the pad. The cleaning head 442 can be moved by the arm 444 (and the drive train 446) to engage the mopping pad 309 in a scraping manner to agitate the pad and to help release debris from the pad. Following spraying and scraping of the pad, the robot 300 can navigate to remove the cleaning pad assembly 308 from the docking station to continue or begin a cleaning (e.g., mopping) mission. The cleaning head 442 can be located below the pad assembly 308 or above the pad assembly 308. Various aspects of the robot 300 and the docking station 400 are discussed in further detail below.

Figure 4:
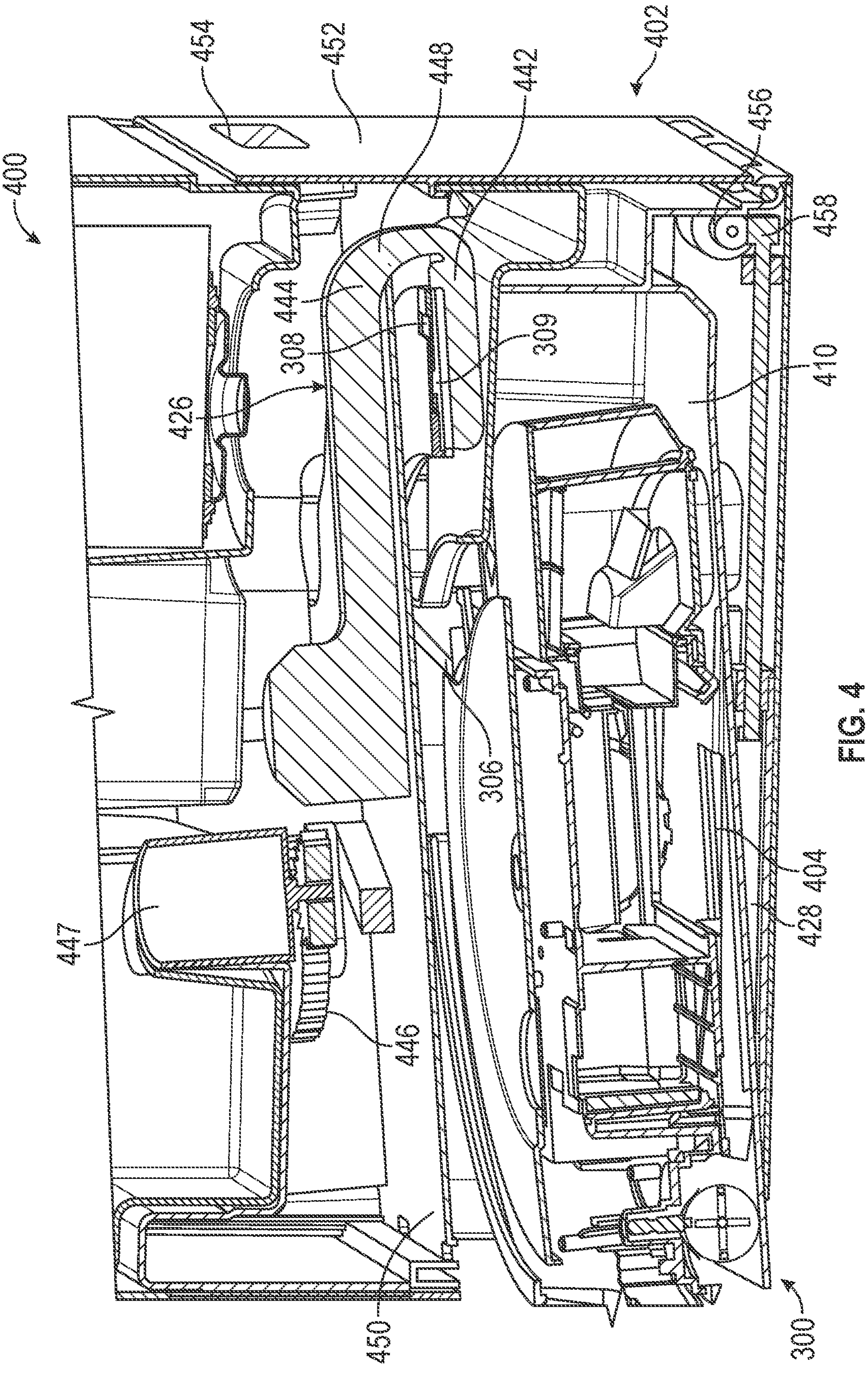
FIG. 4 illustrates an enlarged side cross-sectional view of a mobile cleaning robot and docking station.

FIG. 4 illustrates an enlarged side cross-sectional view of the mobile cleaning robot 300 and the docking station 400. The mobile cleaning robot 300 and the docking station 400 can be similar to those discussed with respect to FIGS. 3A-3C; further details are shown in FIG. 4. For example, FIG. 4 shows that a drive motor 447 can be connected to the drive train 446. The drive motor 447 can be an electric motor, for example, in communication with the controller 424 and operable to drive the drive train 446 to move the arm 444 to cause movement of the cleaning head 442 with respect to the pad 309 of the pad assembly 308 of the robot 300.

FIG. 4 also shows how the arm 444 of the cleaning assembly 426 can extend along a top portion of the divider 450 and can curve around the divider 450 via the curved portion 448 to position the cleaning head 442 under the divider 450 and under the pad assembly 308 and the pad 309 to allow the cleaning head 442 to engage the pad 309 for cleaning of the cleaning pad 309 by the cleaning head 442.

FIG. 4 also more clearly shows the access door 452 connected to the housing 402. The access door 452 can include a handle 454 for removal or opening of the access door for access to the tray 432, such as for removal of the tray 432 from the housing 402 and for cleaning of the tray 432 or other fluidic or cleaning components.

FIG. 4 also more clearly shows a motor 456 and an actuator 458 connected to the charging sled 428. As discussed in further detail below with respect to FIGS. 7-8C, the motor 456 can be operable to move the actuator 458 to retract the charging sled 428 with respect to the base 404 (e.g., ramp 410) such as during docking and to extend the charging sled 428 with respect to the base 404 after docking.

FIG. 4 also shows that arms 306 of the robot 300 can extend rearward to position the cleaning pad assembly 308 between the tray 432 and the divider 450. Optionally, the robot 300 can be operated to position the arms 306 such that the top or back portion of the pad assembly 308 engages the divider 450. Such engagement can help to reduce upward movement of the cleaning pad assembly 308 during cleaning operations performed on the cleaning pad 309 by the cleaning head 442, which can help to increase a force applied to the cleaning pad 309 by the cleaning head 442, which can help to improve cleaning performance.

Figure 5B:
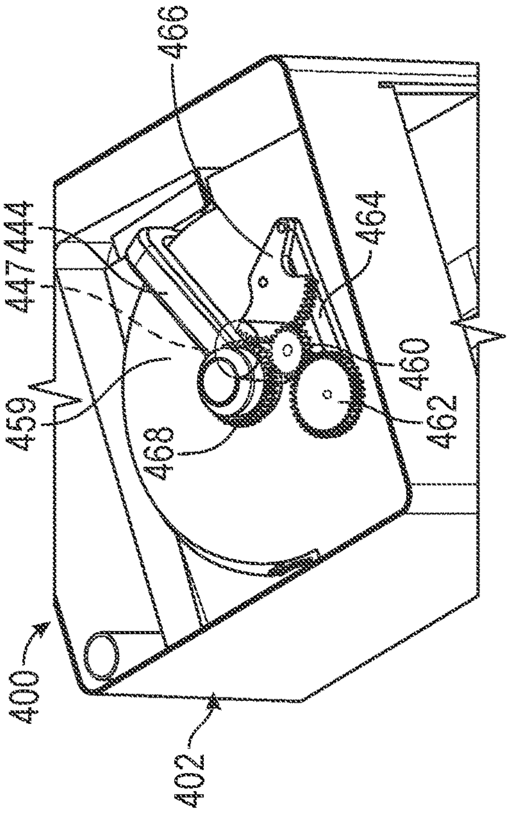
FIG. 5B illustrates a top isometric view of a drive train of a cleaning system of a docking station.
Figure 5C:
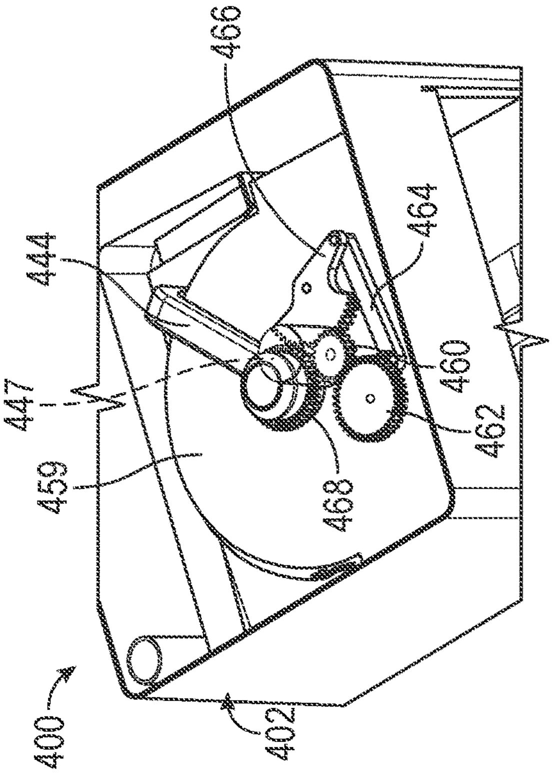
FIG. 5C illustrates a top isometric view of a drive train of a cleaning system of a docking station.
Figure 5A:
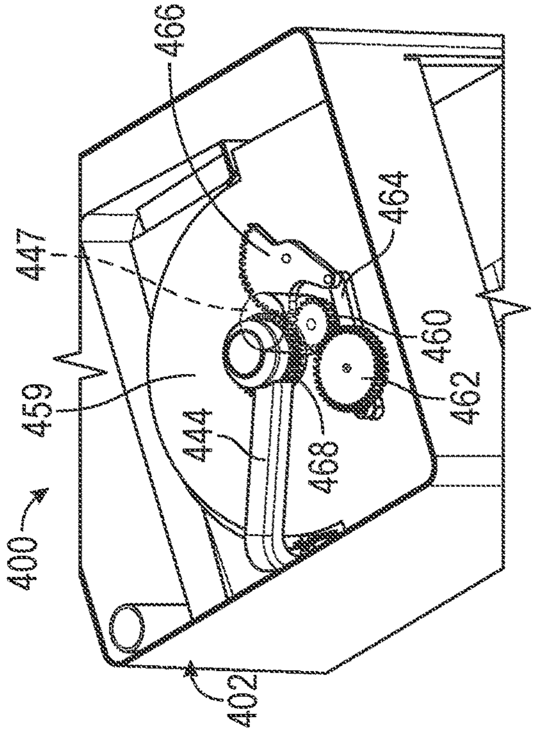
FIG. 5A illustrates a top isometric view of a drive train of a cleaning system of a docking station.

FIG. 5A illustrates a top isometric view of a drive train 459 of a cleaning system 426 of a docking station 400. FIG. 5B illustrates a top isometric view of the drive train 459 of the cleaning system 426 of a docking station 400. FIG. 5C illustrates a top isometric view of the drive train 459 of the cleaning system 426 of the docking station 400. FIGS. 5A-5C are discussed together below. The docking station 400 can be similar to those discussed with respect to FIGS. 3A-4; further details are shown in FIGS. 5A-5C. For example, FIGS. 5A-5C show the drive train 459 connected to the arm 444 in multiple states or conditions.

The motor 447 can be connected to a drive gear 460, which can be connected to a shaft of the motor 447. The drive gear 460 can be connected to a speed gear 462, which can be configured to adjust a rotational speed of the drive train 459. The speed gear 462 can be connected to a bar 464, such as by a pin or other fastener. The bar 464 can be connected to a reversing gear 466, which can be engaged with a driven gear 468 of the arm 444. The gears of the drive train 459 can all be external spur gears, but can be other types of gears, such as worm gears, helical gears, bevel gears, or the like.

In the first condition, shown in FIG. 5A, the arm can be at or near a left-most position where the cleaning head (of FIG. 4) can be engaged with a left-most portion of the cleaning pad 309. The motor 447 can be driven to rotate, to cause rotation of the drive gear 460 and the speed gear 462, which can drive the bar 464 to translate. Such translation of the bar 464 can cause the reversing gear 466 to move downwards (counter-clockwise from a top perspective). This movement of the reversing gear 466 can drive the driven gear 468 and therefore the arm 444 (and the cleaning head 442) to rotate to the right (clockwise from a top perspective) about the driven gear 468 along an arcuate path that is along the mopping pad 309 to scrub or scrape the pad 309.

Once the speed gear 462 has turned sufficiently far (when the arm 444 and the reversing gear 466 reach their end of travel), the speed gear can pull the bar 464, reversing direction of the reversing gear 466 to drive the driven gear 468 and the arm 444 to rotate to the left (counter-clockwise from a top perspective), as shown in FIG. 5C. When the arm 444 and the cleaning head reach the position of FIG. 5A, the drive train 459 (i.e., the reversing gear 466, the driven gear 468, and the arm 444) can reverse again. Such a cycle of moving the arm 444 and the cleaning head 442 along an arcuate path to scrape the mopping pad 309 can be repeated as necessary to remove dirt and debris from the pad 309.

A stepper motor or a servo motor can be used in place of the motor 447 and one or more components of the actuator 458 to achieve similar motion of the arm 444 and the cleaning head 442.

Figure 6A:
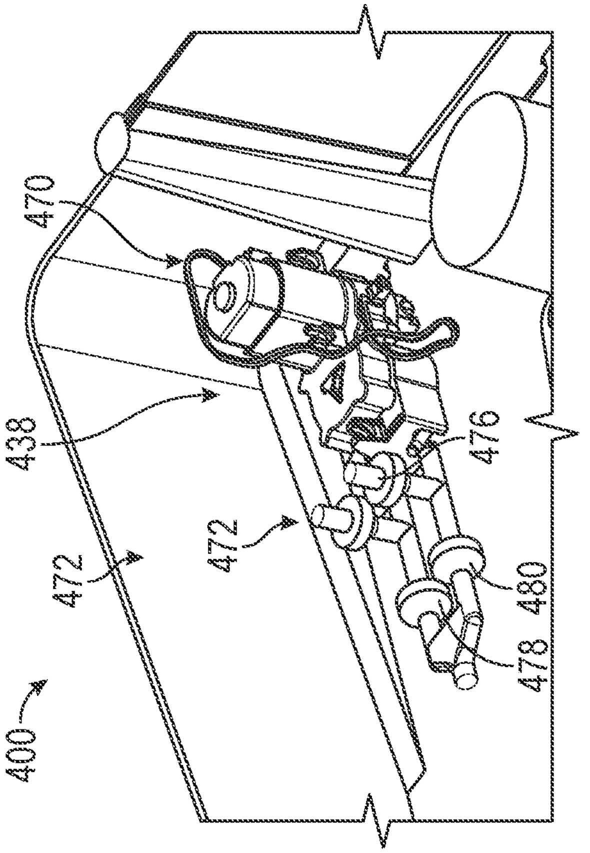
FIG. 6A illustrates an enlarged top isometric view of a portion of a docking station.
Figure 6B:
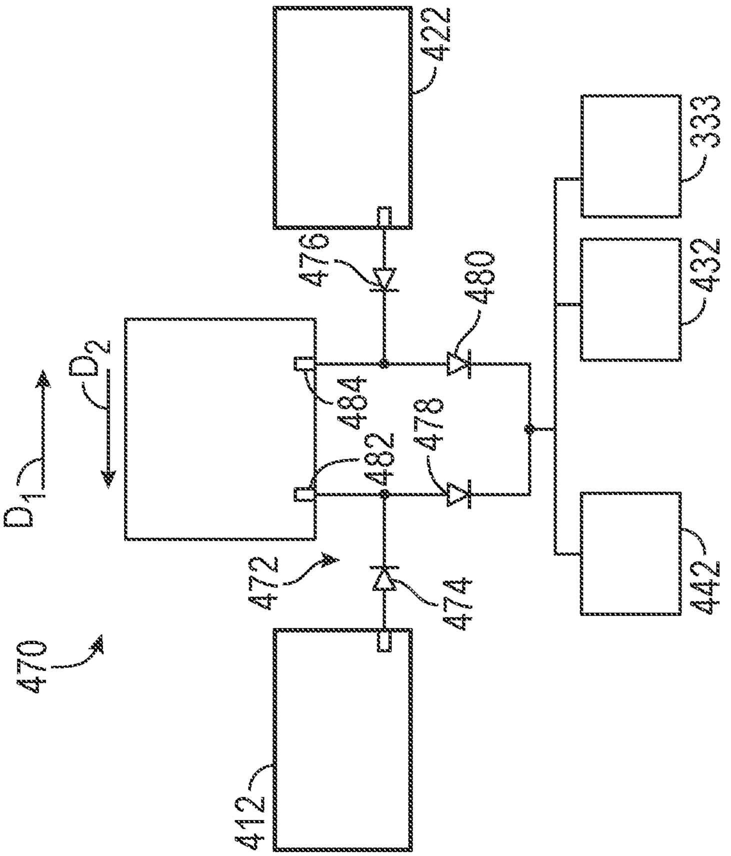
FIG. 6B illustrates a schematic view of a portion of a docking station.

FIG. 6A illustrates an enlarged top isometric view of a portion of the docking station 400. FIG. 6B illustrates a schematic view of a portion of the docking station 400. FIGS. 6A-6B are discussed together below. The docking station 400 of FIGS. 6A-6B can be similar to those discussed with respect to FIGS. 3A-5C; further details are shown in FIGS. 6A-6B. For example, FIGS. 6A and 6B show that the detergent pump 438 can be a pump assembly or system including a bidirectional pump 470 and a piping system 472. The piping system 472 can be connected to the water tank 412 and the detergent tank 422, as shown in FIG. 6B.

A check valve 474 can be located downstream of the water tank 412 and upstream of the bidirectional pump 470 such that water can only flow from the water tank 412 to the bidirectional pump 470 or the piping system 472. Similarly, a check valve 476 can be located downstream of the detergent tank 422 and upstream of the bidirectional pump 470 such that water can only flow from the detergent tank 422 to the bidirectional pump 470 or the piping system 472.

The bidirectional pump 470 can include two inlet/outlets, 482 and 484. The line connected to the inlet/outlet 482 can include a check valve 478 and the inlet outlet 484 can be connected to a check valve 480. These check valves can generally help to ensure that fluid does not flow the wrong direction when the bidirectional pump 470 reverses pumping directions. More specifically, when the bidirectional pump 470 is operated in a first mode to pump fluid from the water tank 412, the bidirectional pump 470 can be operated to pump fluid in direction D1 such that water is drawn through the water tank 412 through the inlet 482 where the check valve 478 can prevent flow of fluid from the cleaning head 442 or the tray 432. The bidirectional pump 470 can draw the water from the tank 412 through the bidirectional pump 470, and out the outlet 484. The check valve 476 can block flow of water into the detergent tank 422 and the check valve 480 can allow flow to travel out from the outlet 484 to the tray 432 or the cleaning head 442. Optionally, one or more valves can control flow of fluid to an onboard tank of the robot 300 (or to the tray 432) or the cleaning head 442.

When the bidirectional pump 470 is operated in a second mode to pump fluid from the detergent tank 422, the bidirectional pump 470 can be operated to pump fluid in direction D2 such that detergent (or cleaning agent) is drawn through the detergent tank 422 through the inlet 484 where the check valve 480 can prevent flow of fluid from the cleaning head 442 or the onboard tank of the robot 300 (or the tray 432). The bidirectional pump 470 can draw the detergent from the tank 422 through the bidirectional pump 470, and out the outlet 482. The check valve 474 can block flow of water into the water tank 412 and the check valve 478 can allow flow to travel out from the outlet 482 to the onboard tank of the robot 300 (or the tray 432) or the cleaning head 442. In this way, a single pump can be used to pump either water or detergent (or another fluid) from two different sources to one or more downstream components (e.g., tank, tray 432, or cleaning head 442), which can help to save manufacturing costs, helping to save space, and helping to increase reliability by including fewer components that can fail.

Figure 7:
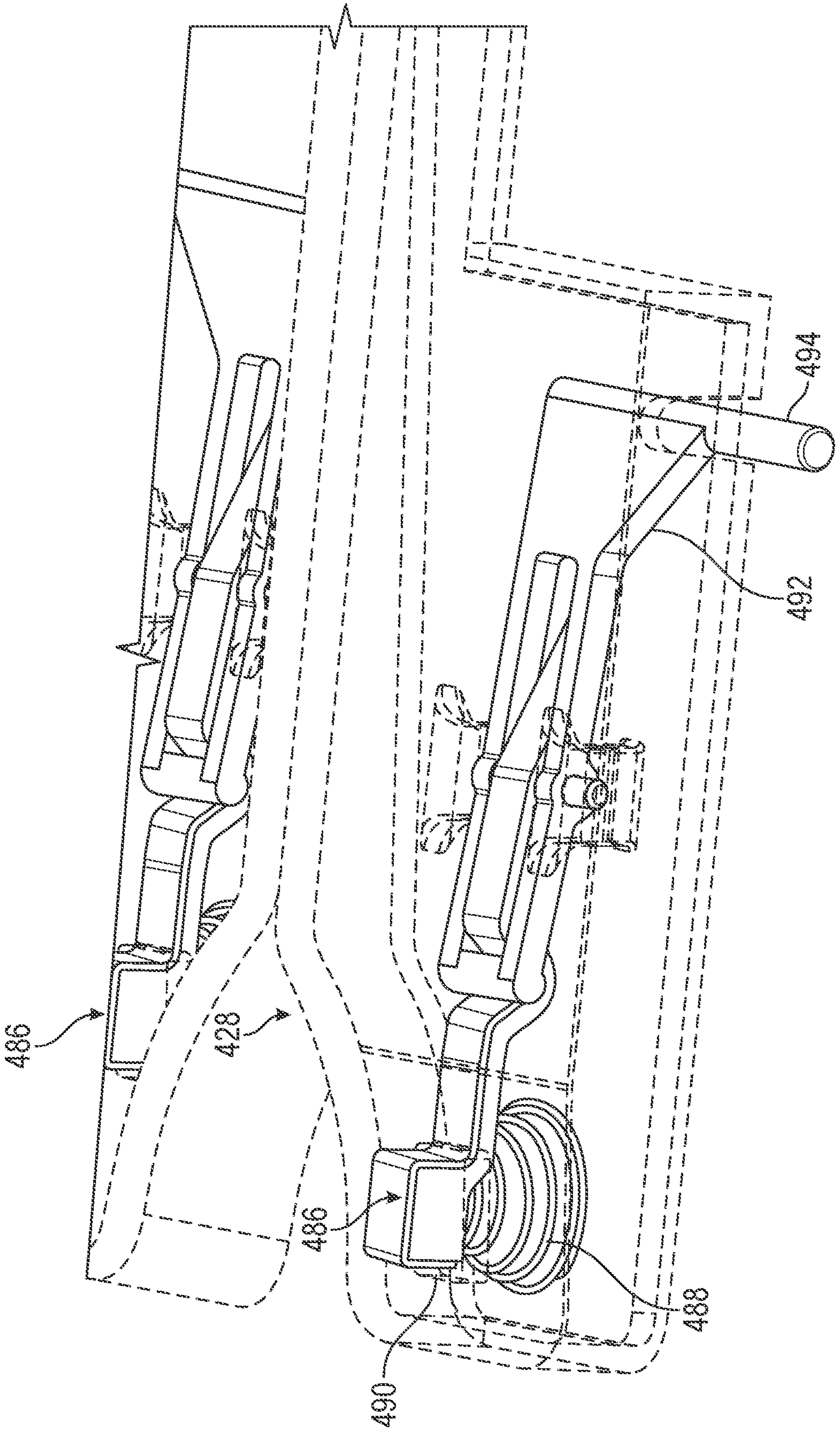
FIG. 7 illustrates an enlarged isometric view of a portion of a docking station.

FIG. 7 illustrates an enlarged top isometric view of a portion of the charging sled 428 of the docking station 400. FIG. 7 shows how a contact 486 of the charging sled 428 can be biased by a biasing element 488 (e.g., spring) to extend upward through an opening 490 of the sled 428. The contact 428 can be engaged with a lever 492 that can be operable by a bar 494 to move the contact 486 downward by compressing the spring 488, such as when the sled 428 is retracted, as discussed below with respect to FIGS. 8A-8C.

Figure 8A:
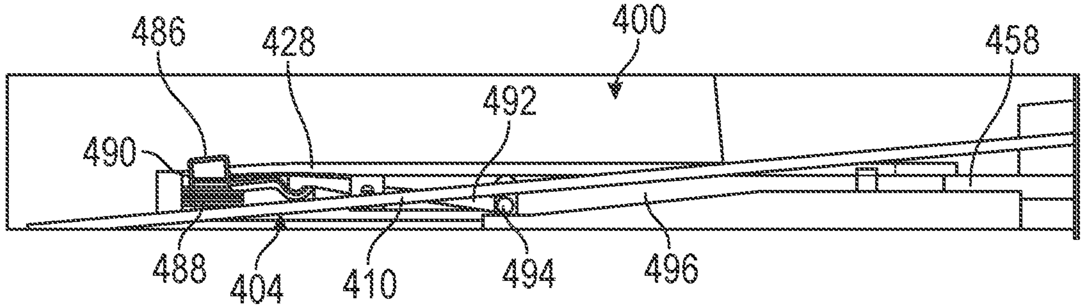
FIG. 8A illustrates a side cross-sectional view of a portion of a docking station.
Figure 8B:
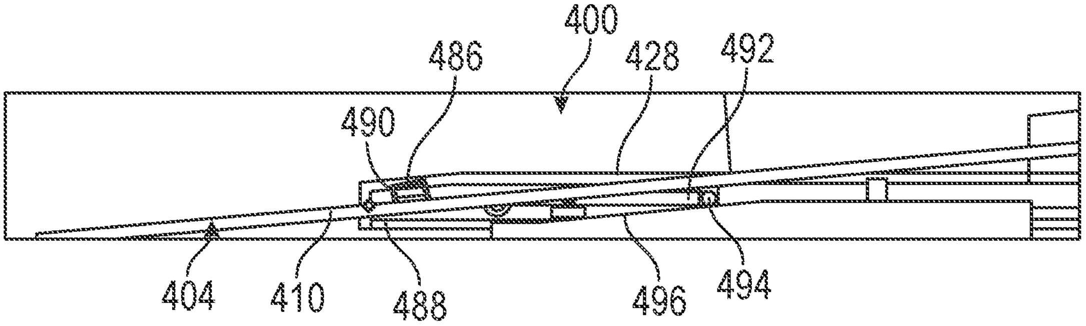
FIG. 8B illustrates a side cross-sectional view of a portion of a docking station.
Figure 8C:
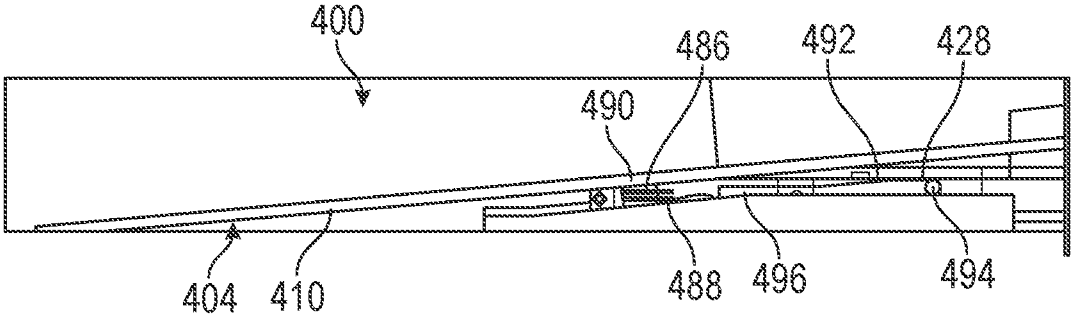
FIG. 8C illustrates a side cross-sectional view of a portion of a docking station.

FIG. 8A illustrates a side cross-sectional view of a portion of the docking station 400. FIG. 8B illustrates a side cross-sectional view of a portion of the docking station 400. FIG. 8C illustrates a side cross-sectional view of a portion of the docking station 400. FIGS. 8A-8C are discussed together below. The docking station 400 of FIGS. 8A-8C can be similar to those discussed with respect to FIGS. 3A-7; further details are shown in FIGS. 8A-8C.

For example, FIG. 8A shows that the sled 428 can be in an extended position with respect to the ramp 410 of the base 404 such that the contact 486 is free to be biased upward through the opening 490, such as to allow contacts of the robot 300 to engage the charging contact 486. In such a position, the actuator 458 can be in an extended position. Then, when it is determined that the robot 300 will begin a docking procedure, the motor 456 (shown in FIG. 4) can be operated to move the actuator (e.g., a threaded rod or lead screw as shown in FIG. 4) to cause rearward translation of the sled 428, as shown in FIG. 8B. Such translation can cause the bar 494 to engage a ramp 496 of the base 404, causing the bar 494 to move upward and the lever 492 to move the contact 486 downward as the biasing element 488 is compressed. Such action can cause the contact 486 to retract into the opening 490 of the sled 428 such that the contact 486 does not extend beyond the opening 490.

The motor 456 can continue to be operated to move the actuator 458 until the sled 428 is in a fully retracted position, as shown in FIG. 8C where the sled 428 (and contact 486) is at or below a surface of the ramp 410, such as to help limit engagement between the robot 300 and the charging contacts 486, to help reduce wear of the contacts 486. Optionally, the sled 428 can be pulled back underneath the ramp 410 to further help limit contact between the robot 300 and the contacts 486. Once the pad assembly 308 has passed over the contacts 486, the motor 456 can be operated to move the actuator 458 forward to return the sled 428 to the extended position (of FIG. 8A) to release the bar 494, allowing the contacts 486 to extend from the openings 490, such as to allow engagement of the charging contacts 486 with contacts of the robot 300. Such components can help limit interaction between the charging contacts and a wet mopping pad.

Figure 9:
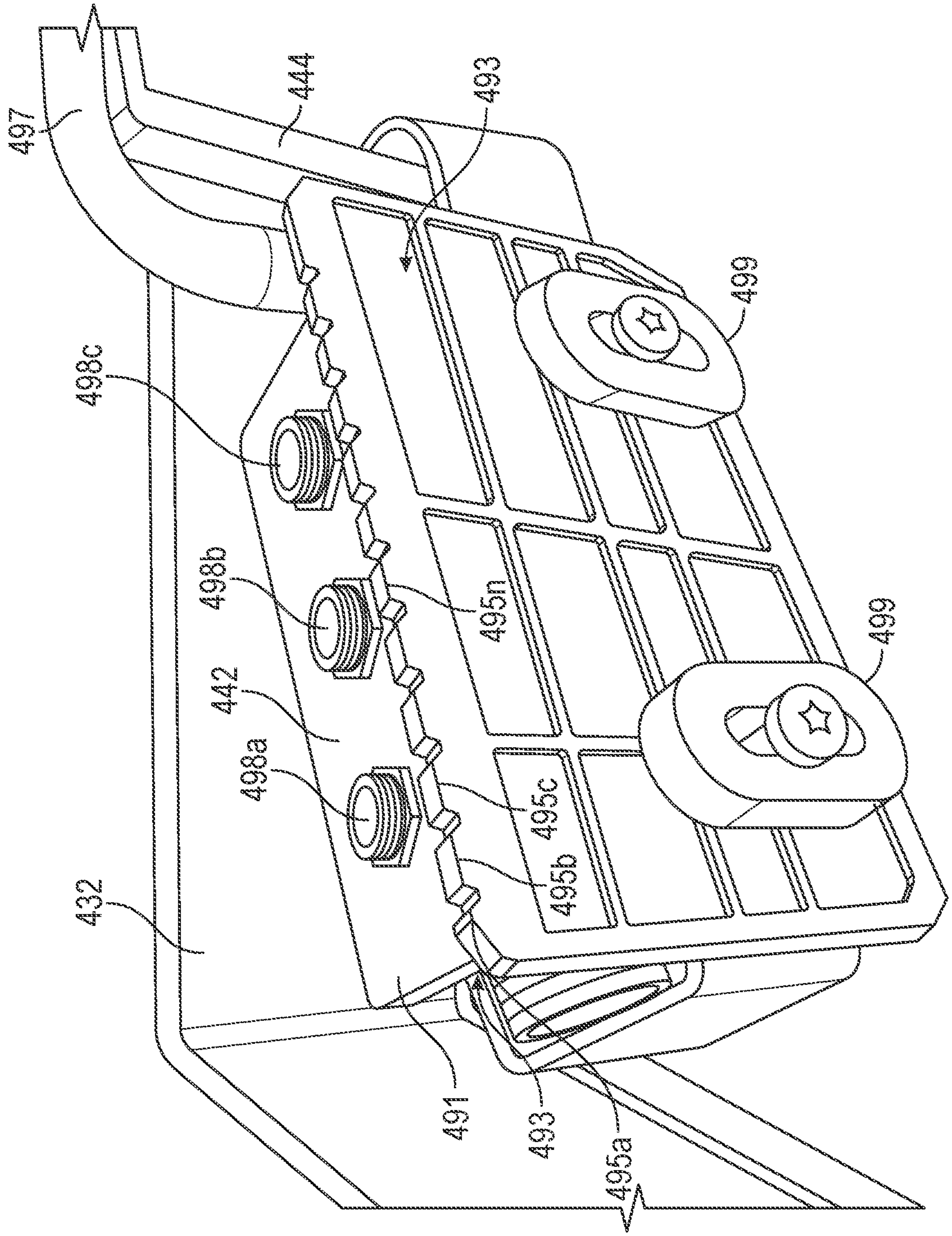
FIG. 9 illustrates a perspective view of a portion of a docking station.

FIG. 9 illustrates a perspective view of a portion of the docking station 400. FIG. 9 shows that the cleaning head 442 can include a body 491 that can be a rigid or semi-rigid member made of materials such as metals, plastics, foams, or the like. The body 491 can be connected to the arm 444 to allow the arm 444 to move the components of the cleaning head 442. The cleaning head 442 can be positioned within the tray 432 (or over the tray 432).

The cleaning head 442 can also include a scraper 493 including projections 495*a*-495*n* that can be separated by gaps. The projections 495 can be fingers, bosses, teeth, or the like, configured to engage a mopping pad for cleaning thereof. Optionally, the projections 495 can be rounded to help limit damage to the pad 309 during scraping operations.

The cleaning head 442 can include a supply line 497 that can be connected to one or more pumps (e.g., the detergent pump 438). The supply line 497 can be connected to the body 491 to connect the supply line 497 to nozzles 498*a*-498*c*. Though three nozzles are shown, 1, 2, 4, 5, 6, 7, 8, 9, or the like nozzles can be used. The nozzles 498 can be separate components (nozzles) embedded (e.g., press fit or threaded) to the body 491 but can be optionally molded into the body 491 (e.g., molding or drilling). The nozzles 498 can be positioned to spray water or fluid from a bottom position in an upward direction. Optionally, the nozzles 498 can be positioned to spray water or fluid from a top position in a downward direction. The cleaning head 442 can optionally include bearings 499, which can be wheels, bushings, pads, or the like to support the cleaning head 442 off the tray 432 and help to reduce friction therebetween.

In operation, water or detergent can be delivered to the nozzles 498 through the supply line 497 so that the cleaning head 442 can spray the pad 309. The arm 444 can also be driven (e.g., by the gear train 459) to move the arm 444 and the cleaning head 442 to scrape the pad 309 with the projections 495*a*-495*n* of the scraper to agitate and release debris from the pad 309 and into the tray 432. In this way, the cleaning head 442 can spray and scrape the pad 309 simultaneously or in series to clean the cleaning pad 309.

Optionally, when detergent is used for cleaning of the pad 309, water only can be delivered to the nozzles 498 for rinsing of the detergent from the pad 309 for rinsing of the detergent from the pad 309 before a cleaning mission is continued or commenced.

Figure 10:
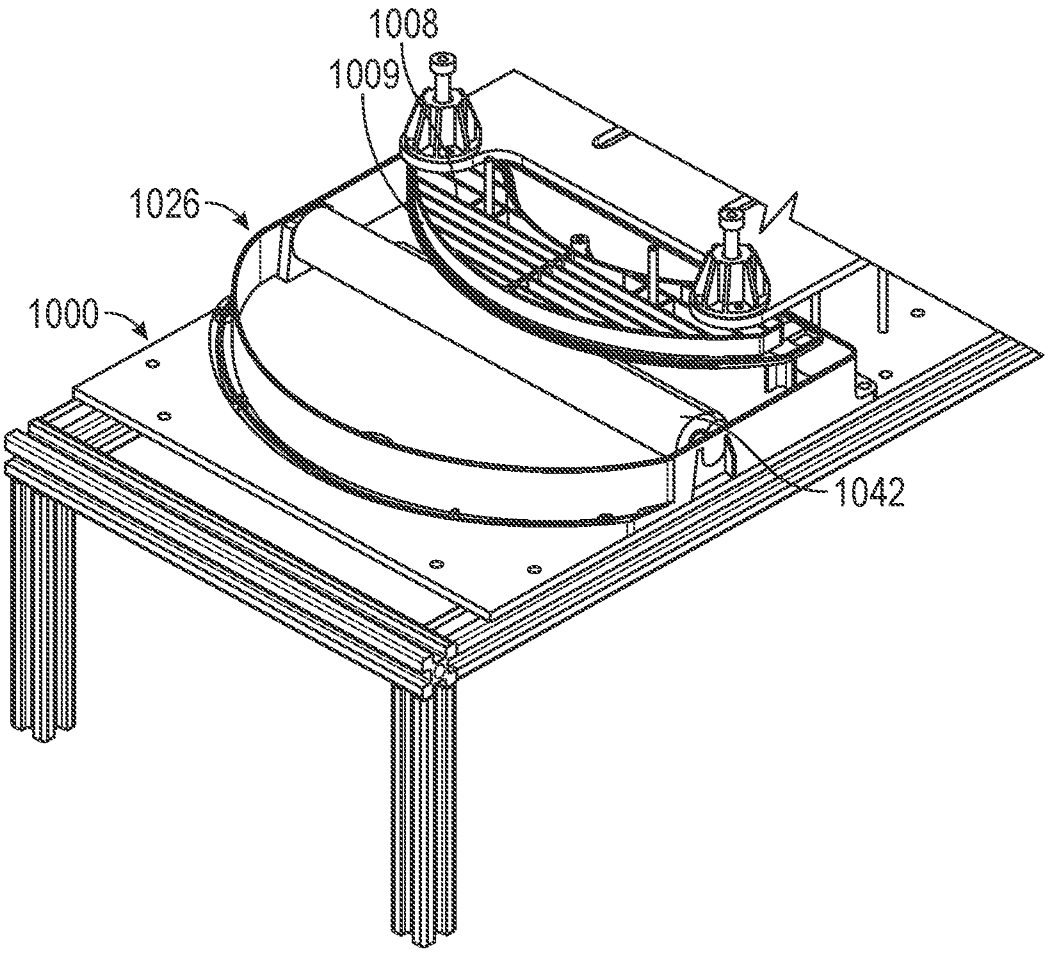
FIG. 10 illustrates an isometric view of a docking station.

FIG. 10 illustrates an isometric view of a docking station 1000 including a pad cleaning system 1026. The pad cleaning system 1026 can be incorporated into any of the docking stations discussed above or below. The pad cleaning system 1026 can be configured to clean a mopping pad 1009 of a pad tray 1008 (such as of a mobile cleaning robot). The pad cleaning system 1026 can include a cleaning head 1042 that can be a roller configured to engage the cleaning pad 1009 to squeeze out waste water or debris from the pad 1009. The roller can be wetted or the cleaning pad 1009 can be sprayed by nozzles at or near the roller of the cleaning head 1042.

Figure 11:
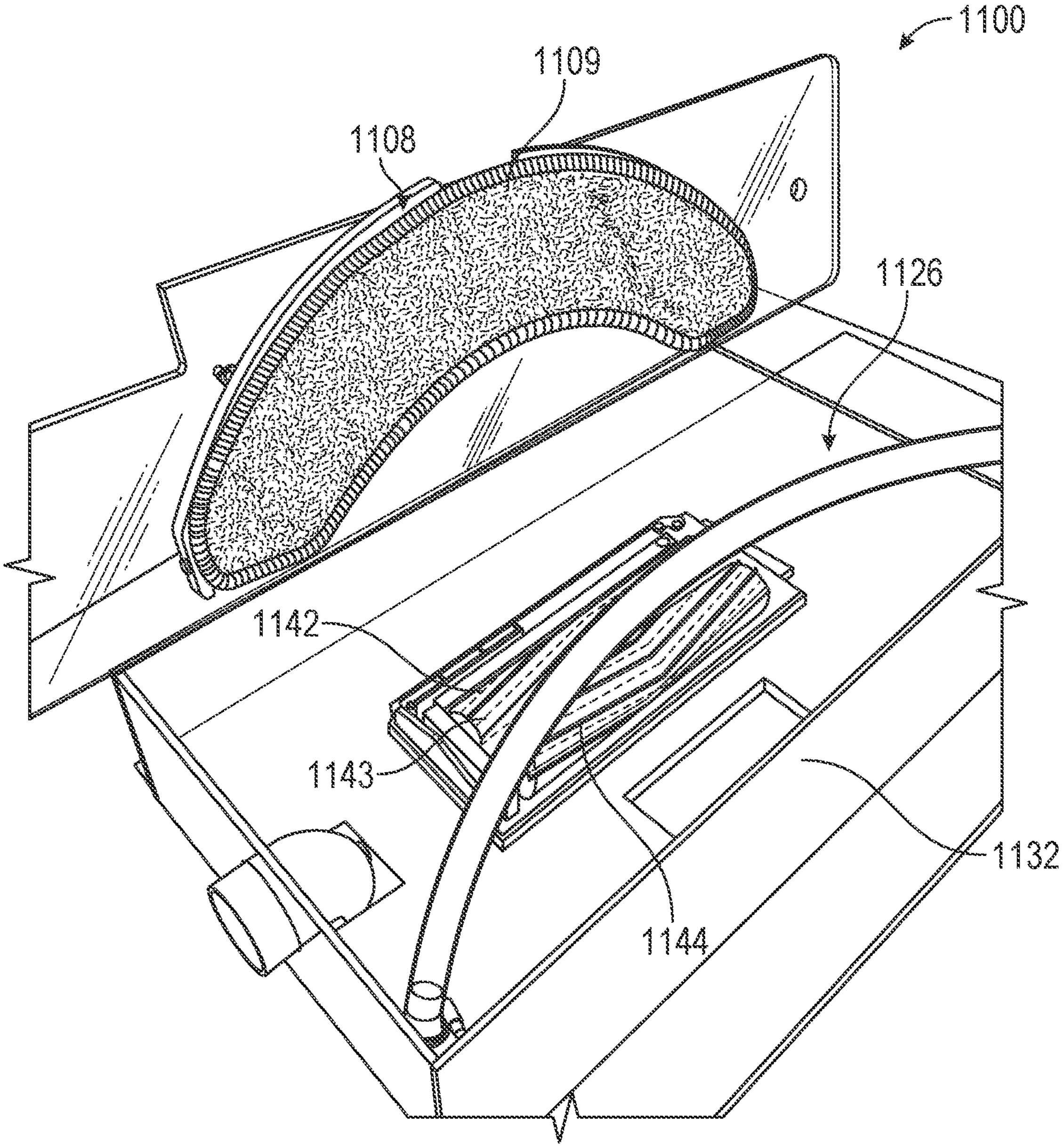
FIG. 11 illustrates an isometric view of a docking station.

FIG. 11 illustrates an isometric view of a docking station 1100 including a pad cleaning system 1126. The pad cleaning system 1126 can be incorporated into any of the docking stations discussed above or below. The pad cleaning system 1126 can be configured to clean a mopping pad 1109 of a pad tray 1108 (such as of a mobile cleaning robot). The pad cleaning system 1026 can include a cleaning head 1142 that can include a first roller 1143 and a second roller 1144 positioned in a tray 1132 and configured to engage the cleaning pad 1109. The rollers 1143 and 1144 can be wetted or the cleaning pad 1109 can be sprayed by nozzles at or near the rollers 1143 and 1144. The rollers 1143 and 1144 can be arranged or configured to rotate in opposing directions (e.g., towards each other) to help improve cleaning of the pad 1109.

Figure 12:
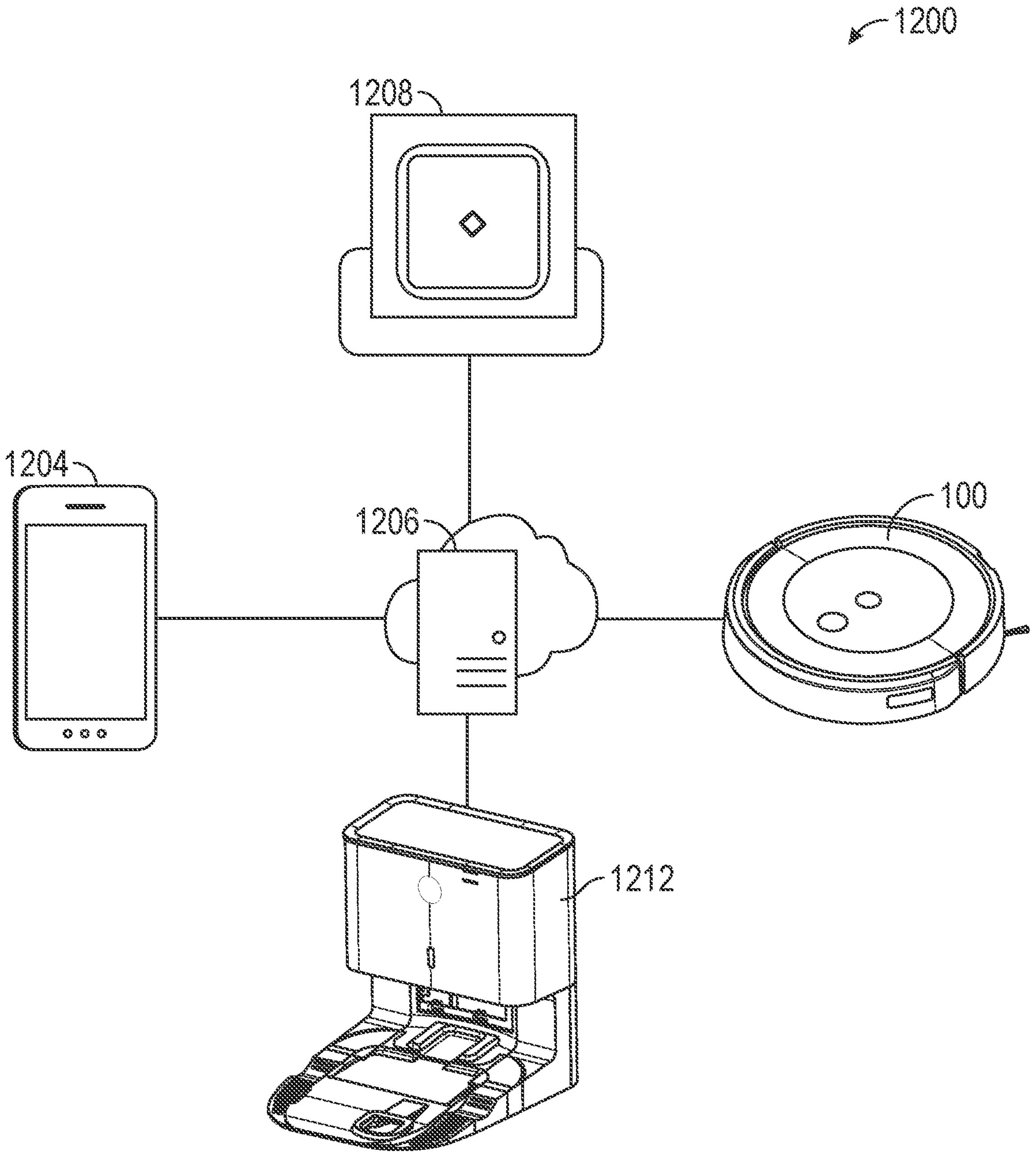
FIG. 12 illustrates a schematic view of a network.

FIG. 12 illustrates a schematic view of a mobile cleaning robot network 1200 that enables networking between the mobile robot 100 and one or more other devices, such as a mobile device 1204, a cloud computing system 1206, another autonomous robot 1208 separate from the mobile robot 100, or a docking station 1212.

Using the communication network 1200, the robot 100, the mobile device 1204, the robot 1208, and the cloud computing system 1206 can communicate with one another to transmit and receive data from one another. In some examples, the robot 100, the docking station 1212, or both the robot 100 and the docking station 1212 communicate with the mobile device 1204 through the cloud computing system 1206. Alternatively, or additionally, the robot 100, the docking station 1212, or both the robot 100 and the docking station 1212 can communicate directly with the mobile device 1204. Various types and combinations of wireless networks (e.g., Bluetooth, radio frequency, optical based, etc.) and network architectures (e.g., point-to-point or mesh networks) can be employed by the communication network 1200.

In some examples, the mobile device 1204 can be a remote device that can be linked to the cloud computing system 1206 and can enable a user to provide inputs. The mobile device 1204 can include user input elements such as, for example, one or more of a touchscreen display, buttons, a microphone, a mouse, a keyboard, or other devices that respond to inputs provided by the user. The mobile device 1204 can also include immersive media (e.g., virtual reality) with which the user can interact to provide input. The mobile device 1204, in these examples, can be a virtual reality headset or a head-mounted display.

The user can provide inputs corresponding to commands for the mobile robot 100. In such cases, the mobile device 1204 can transmit a signal to the cloud computing system 1206 to cause the cloud computing system 1206 to transmit a command signal to the mobile robot 100. In some implementations, the mobile device 1204 can present augmented reality images. In some implementations, the mobile device 1204 can be a smart phone, a laptop computer, a tablet computing device, or other mobile device.

In some examples, the communication network 1200 can include additional nodes. For example, nodes of the communication network 1200 can include additional robots. Also, nodes of the communication network 1200 can include network-connected devices that can generate information about the environment. Such a network-connected device can include one or more sensors, such as an acoustic sensor, an image capture system, or other sensor generating signals, to detect characteristics of the environment from which features can be extracted. Network-connected devices can also include home cameras, smart sensors, or the like.

In the communication network 1200, the wireless links can utilize various communication schemes, protocols, etc., such as, for example, Bluetooth classes, Wi-Fi, Bluetoothlow-energy, also known as BLE, 802.15.4, Worldwide Interoperability for Microwave Access (WiMAX), an infrared channel, satellite band, or the like. In some examples, wireless links can include any cellular network standards used to communicate among mobile devices, including, but not limited to, standards that qualify as 1G, 2G, 3G, 4G, 5G, or the like. The network standards, if utilized, qualify as, for example, one or more generations of mobile telecommunication standards by fulfilling a specification or standards such as the specifications maintained by International Telecommunication Union. For example, the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA.

According to some examples discussed herein, the robot can be navigated to a docking station. For example, the robot 300 (or 100) can be navigated (e.g., autonomously) to the docking station 400 (or 200). When the robot 300 approaches, the docking station 400 can be informed (such as via the network 1200), and the docking station can use its controller (e.g., controller 424) to operate the motor 456 to retract the sled 428 and the charging contacts. Once the robot 300 or docking station 400 determines that the robot 300 has docked, the motor 456 can be operated to move the sled 428 such that the contacts 486 engage contacts of the robot 300.

Before or during docking of the robot 300, the cleaning pad 309 of the mobile cleaning robot 300 can be moved to a location above the cleaning tray 432 of the docking station 400. When the cleaning pad 309 is in place, the controller 424 can operate the pump to deliver water or liquid from the storage tank 412 to the cleaning tray 432 or the cleaning head 442. Also, the controller can control the bidirectional pump 470 to pump detergent (or a cleaning agent) from the detergent tank 422 to a storage tank of the robot 300 (or to the cleaning tray 432) or the cleaning head 442. The controller 424 can control a pumping direction of the bidirectional pump 470 to control a mixture of water and detergent delivered by the cleaning head 442 to a storage tank of the robot 300 (or to the tray 432). The controller 424 can communicate a status of the tray 432 to the robot 300 to allow the robot to determine when to move the pad 309 into the tray 432 and when to remove the pad 309 from the tray (e.g., after soaking).

Optionally, the robot 300 can move its arms to position the cleaning pad 309 in liquid of the tray 432 to soak the cleaning pad 309. The docking station 400 and the robot 300 can communicate such a sequence to wait to begin spraying and scraping of the pad 309 until after the pad is done soaking. Following soaking, the robot 300 can move the pad 309 out of the fluid of the tray and the pad 309 can be sprayed, such as by nozzles of the cleaning head 442 onto the pad 309. The robot 300 can communicate to the docking station 400 (such as through the network 1200) the position of the arm before scraping begins. Similar communications between the robot 300 and the docking station 400 can occur during or after each position change of the robot 300 or its components.

Once the robot 300 indicates to the docking station that the pad 309 is out of the fluid and engaged with the cleaning head 442, the cleaning head 442 can be operated to spray fluid on the pad 309 and scrape the pad 309. Spraying and cleaning can be performed until the pad is clean, such as for a predetermined time of 30 seconds, 1, 2, 3, 4, 5, 6, 7, 8, 9, 10, 15 minutes, or the like.

The turbidity sensor 440 can be located at or near the tray 432 and can be configured to monitor fluid in the tray 432. The turbidity sensor 440 can transmit a signal to the controller 424 that can be used by the controller to determine a cleanliness of the pad 309. When the controller 424 determines that the pad 309 is still dirty, the controller 424 can operate the cleaning head 442 (and one or more pumps) to continue cleaning of the pad 309 until the turbidity sensors 440 returns a signal to the controller 424 indicating that the pad 309 is clean. Optionally, a minimum cleaning time can be used in addition to the turbidity signal to determine when cleaning of the pad 309 can be stopped.

During cleaning of the pad 309, the vacuum suction diverter valve 420 can be positioned to vacuum water or fluid out of the tray 432 and the evacuation system 414 can be operated (continuously or intermittently) to draw fluid or debris out of the tray 432 to empty the tray 432 of the fluid (e.g., water or detergent) and debris.

Figure 13:
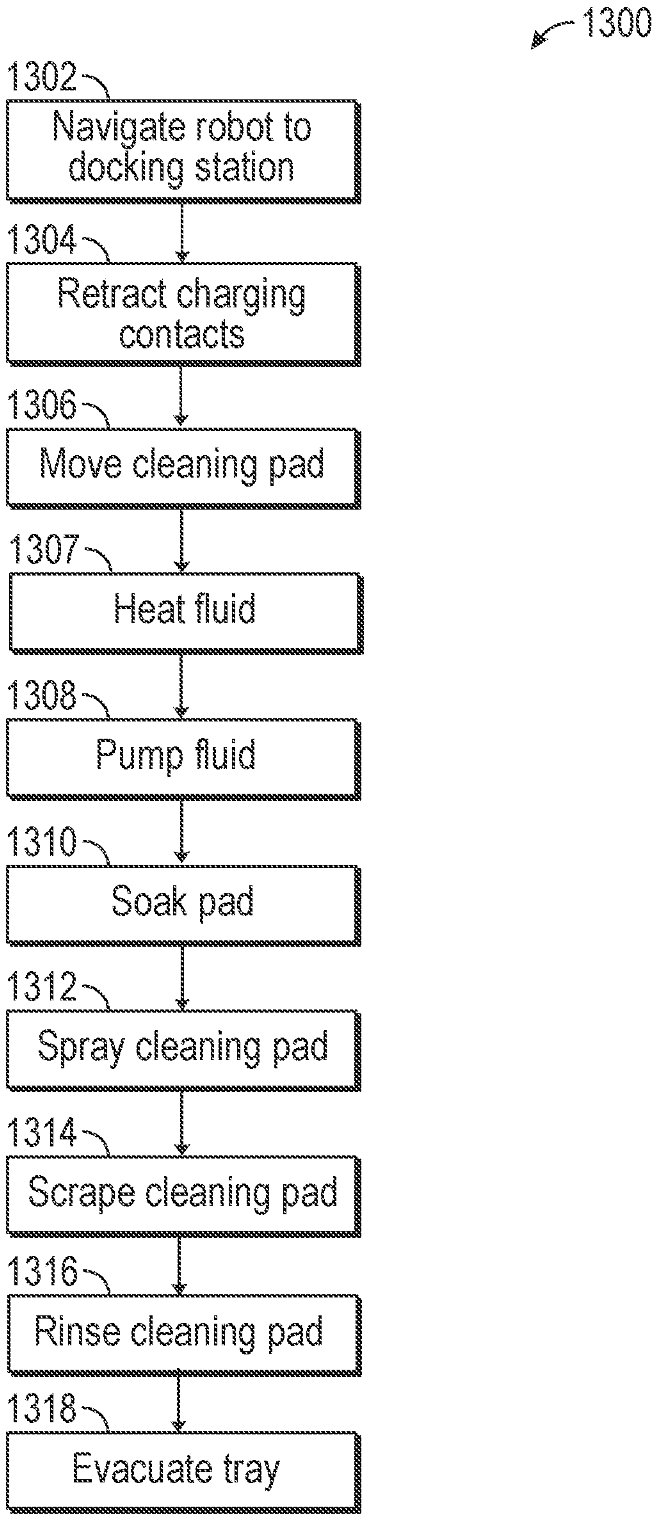
FIG. 13 illustrates a block diagram of a method of operating a mobile cleaning robot and docking station.

FIG. 13 illustrates a block diagram of a method 1300 of operating a mobile cleaning robot and docking station. More specific examples of the method 1300 are discussed below. The steps or operations of the method 1300 are illustrated in a particular order for convenience and clarity; many of the discussed operations can be performed in a different sequence or in parallel without materially impacting other operations. The method 1300 as discussed includes operations performed by multiple different actors, devices, and/or systems. It is understood that subsets of the operations discussed in the method 1300 can be attributable to a single actor, device, or system could be considered a separate standalone process or method.

At step 1302, the robot can be navigated to a docking station. For example, the robot 300 can be navigated (e.g., autonomously) to the docking station 400. At step 1304, charging contacts of the docking station can be retracted. For example, the sled 428 of the docking station 400 can be retracted to retract the contacts 486. The charging contacts can be extended after navigating the robot into the docking station.

At step 1306, a cleaning pad of the mobile cleaning robot can be moved to a location above a cleaning tray of the docking station. For example, the cleaning pad 309 of the robot 300 can be moved above or into the cleaning tray 432 of the docking station 400. At step 1308, water or liquid can be pumped from a storage tank located at least partially within the docking station into the cleaning tray. For example, water can be pumped from the water tank 412 onboard tank of the robot 300 (optionally to the cleaning tray 432) or the cleaning head 442. Also, detergent (or a cleaning agent) can be pumped from the detergent tank 422 to the cleaning head 442 (or optionally to the onboard tank of the robot 300 or the cleaning tray 432). At step 1310, the cleaning pad can be soaked in the liquid before scraping the cleaning pad. For example, the cleaning pad 309 can be soaked in liquid within the tray 432. At step 1312, a pad can be sprayed. For example, water or detergent can be sprayed by nozzles of the cleaning head 442 onto the pad 309. At step 1314, the pad can be scraped. For example, the pad 309 can be scraped by the cleaning head 442. At step 1316, the pad can be rinsed. For example, the pad 309 can be rinsed by the cleaning head 442 with water, such as to rinse the cleaning pad 309 of detergent.

Figure 14:
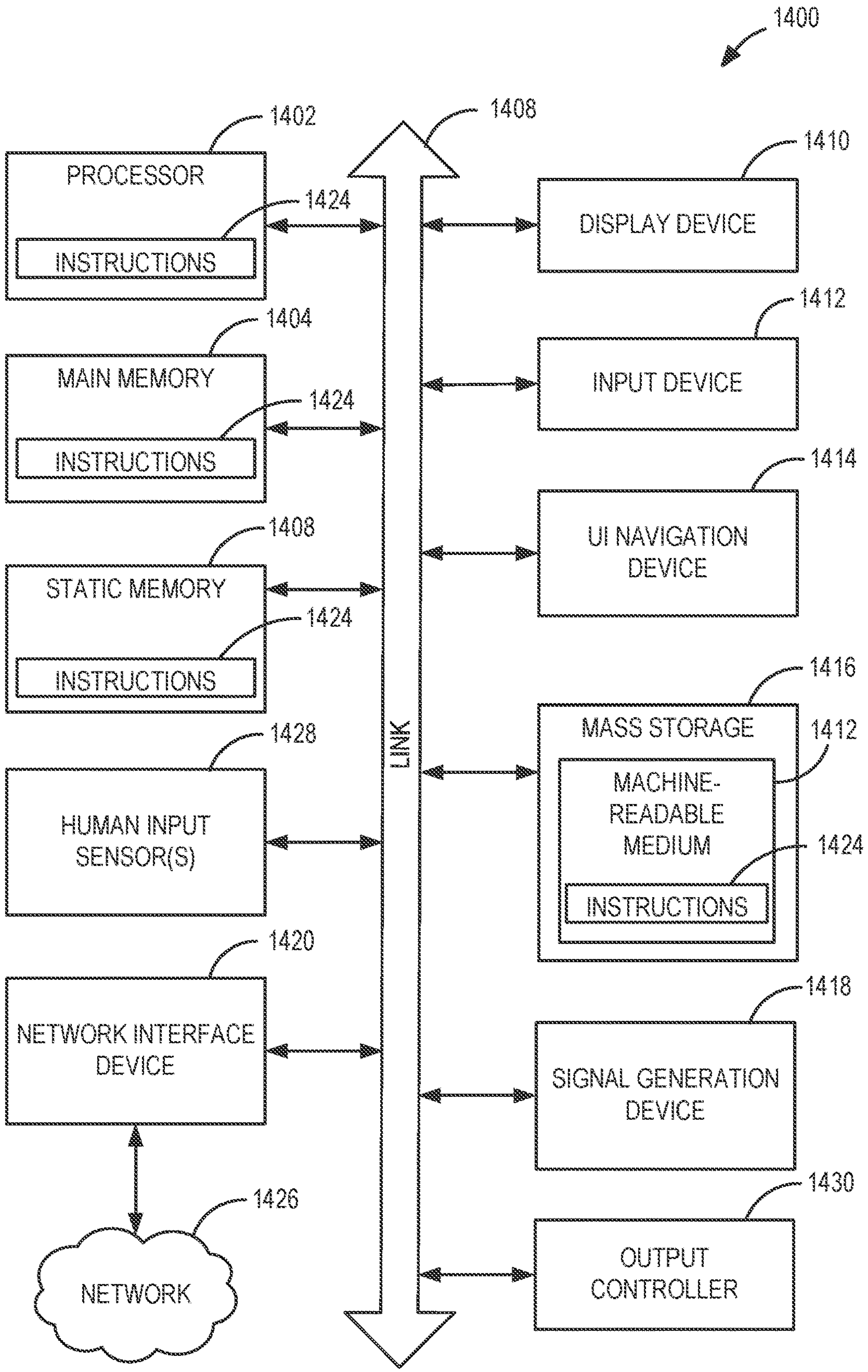
FIG. 14 illustrates a block diagram illustrating an example of a machine upon which one or more embodiments may be implemented.

FIG. 14 illustrates a block diagram of an example machine 1400 upon which any one or more of the techniques (e.g., methodologies) discussed herein may perform. Examples, as described herein, may include, or may operate by, logic or a number of components, or mechanisms in the machine 1400. Circuitry (e.g., processing circuitry) is a collection of circuits implemented in tangible entities of the machine 1400 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1400 follow.

In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1400 may include a hardware processor 1402 (e.g., a central processing unit (CPU), a graphics processing unit (GPU), a hardware processor core, or any combination thereof), a main memory 1408, a static memory (e.g., memory or storage for firmware, microcode, a basic-input-output (BIOS), unified extensible firmware interface (UEFI), etc.) 1406, and mass storage 1408 (e.g., hard drive, tape drive, flash storage, or other block devices) some or all of which may communicate with each other via an interlink (e.g., bus) 1430. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1408, a signal generation device 1418 (e.g., a speaker), a network interface device 1420, and one or more sensors 1416, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1402, the main memory 1404, the static memory 1406, or the mass storage 1408 can be, or include, a machine readable medium 1422 on which is stored one or more sets of data structures or instructions 1424 (e.g., software) embodying or utilized by any one or more of the techniques or functions described herein. The instructions 1424 can also reside, completely or at least partially, within any of registers of the processor 1402, the main memory 1404, the static memory 1406, or the mass storage 1408 during execution thereof by the machine 1400. In an example, one or any combination of the hardware processor 1402, the main memory 1404, the static memory 1406, or the mass storage 1408 can constitute the machine readable media 1422. While the machine readable medium 1422 is illustrated as a single medium, the term "machine readable medium" can include a single medium or multiple media (e.g., a centralized or distributed database, and/or associated caches and servers) configured to store the one or more instructions 1424.

The term "machine readable medium" can include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1424 can be further transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1420 can include one or more physical jacks (e.g., Ethernet, coaxial, or phone jacks) or one or more antennas to connect to the communications network 1426. In an example, the network interface device 1420 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software. A transmission medium is a machine readable medium.

NOTES AND EXAMPLES

The following, non-limiting examples, detail certain aspects of the present subject matter to solve the challenges and provide the benefits discussed herein, among others.

Example 1 is a docking station for a mobile cleaning robot, the docking station comprising: a base portion configured to receive the mobile cleaning robot; a housing connected to the base portion; and a pad cleaning system connected to the housing, the system comprising: a cleaning head engageable with a cleaning pad of the mobile cleaning robot to remove debris from the cleaning pad, the cleaning head including a nozzle configured to discharge a fluid onto the cleaning pad.

In Example 2, the subject matter of Example 1 optionally includes wherein the pad cleaning system includes a pump arranged to deliver a liquid to the cleaning pad.

In Example 3, the subject matter of Example 2 optionally includes wherein the cleaning head includes a plurality of nozzles connected to the pump.

In Example 4, the subject matter of Example 3 optionally includes the cleaning head further comprising: a scraper engageable with the cleaning pad, the scraper movable along the cleaning pad to scrape the cleaning pad to separate debris therefrom.

In Example 5, the subject matter of any one or more of Examples 2-4 optionally include a storage tank located at least partially within the housing, the storage tank arranged to store liquid for delivery to the pump.

In Example 6, the subject matter of Example 5 optionally includes a cleaning agent storage tank located at least partially within the housing, the cleaning agent storage tank arranged to store detergent for delivery to at least one of the tank or the pump.

In Example 7, the subject matter of Example 6 optionally includes wherein the pump is operable in a first mode to pump liquid from the storage tank and is operable in a second mode to pump detergent from the detergent tank.

In Example 8, the subject matter of any one or more of Examples 5-7 optionally include a heater connected to the storage tank to heat the liquid within the storage tank.

In Example 9, the subject matter of any one or more of Examples 4-8 optionally include wherein the scraper is movable to engage the cleaning pad along an arcuate path.

In Example 10, the subject matter of Example 9 optionally includes a cleaning head motor; and a drive arm connected to the scraper motor and the cleaning head.

In Example 11, the subject matter of Example 10 optionally includes a gear train connected to the drive arm and the cleaning head motor.

In Example 12, the subject matter of any one or more of Examples 2-11 optionally include the pad cleaning system further comprising: a tray located at least partially within the housing, the cleaning pad positionable over or in the tray, the tray arranged to receive the liquid therein.

In Example 13, the subject matter of any one or more of Examples 1-12 optionally include an evacuation system located at least partially within the housing, the evacuation system operable to extract debris from a debris bin of the mobile cleaning robot.

In Example 14, the subject matter of any one or more of Examples 1-13 optionally include charging contacts connected to the base portion and engageable with contacts of the mobile cleaning robot to deliver a charge thereto; and a contact sled connected to the contacts and movable to move between an extended position and a retracted position.

Example 15 is a non-transitory machine-readable medium including instructions, for cleaning a cleaning pad of a mobile cleaning robot using a docking station, which when executed by a machine, cause the machine to: navigate the mobile cleaning robot into a docking station; move a cleaning pad of the mobile cleaning robot to a location above a cleaning tray of the docking station; engage the cleaning pad with a scraper of the docking station; deliver a liquid to the cleaning pad; and scrape the cleaning pad using the scraper.

In Example 16, the subject matter of Example 15 optionally includes the instructions to further cause the machine to: navigate the robot to a docking station; retract charging contacts of the docking station; and extend the charging contacts after navigating the robot into the docking station.

In Example 17, the subject matter of Example 16 optionally includes the instructions to further cause the machine to: pump liquid from a storage tank located at least partially within the docking station into the cleaning tray; and position the cleaning pad into a cleaning tray of the docking station.

In Example 18, the subject matter of Example 17 optionally includes the instructions to further cause the machine to: soak the cleaning pad in the liquid before scraping the cleaning pad.

In Example 19, the subject matter of any one or more of Examples 17-18 optionally include the instructions to further cause the machine to: heat the liquid in the storage tank.

In Example 20, the subject matter of any one or more of Examples 17-19 optionally include the instructions to further cause the machine to: move the cleaning pad to a location above the cleaning tray and out of the liquid before scraping the cleaning pad.

In Example 21, the subject matter of any one or more of Examples 15-20 optionally include the instructions to further cause the machine to: rinse the cleaning pad with liquid after scraping the cleaning pad.

In Example 22, the subject matter of any one or more of Examples 15-21 optionally include the instructions to further cause the machine to: evacuate liquid from the cleaning tray into a waste tank.

Example 23 is a docking station for a mobile cleaning robot, the docking station comprising: a base configured to receive the mobile cleaning robot therein or thereon; a housing connected to the base; a pump located at least partially within the housing, the pump configured to deliver a liquid to a cleaning pad of the mobile cleaning robot; a cleaning head engageable with a cleaning pad of the mobile cleaning robot to remove debris from the cleaning pad, the cleaning head including: a nozzle configured to discharge a fluid onto the cleaning pad; and a scraper movable along the cleaning pad to scrape the cleaning pad to separate debris therefrom.

In Example 24, the subject matter of Example 23 optionally includes a storage tank located at least partially within the housing, the storage tank arranged to store liquid for delivery to the pump.

In Example 25, the subject matter of Example 24 optionally includes a cleaning agent storage tank located at least partially within the housing, the cleaning agent storage tank arranged to store detergent for delivery to at least one of the tank or the pump.

In Example 26, the subject matter of Example 25 optionally includes wherein the pump is operable in a first mode to pump liquid from the storage tank and is operable in a second mode to pump detergent from the detergent tank.

In Example 27, the subject matter of any one or more of Examples 24-26 optionally include a heater connected to the storage tank to heat the liquid within the storage tank.

Example 28 is a system to implement of any of Examples 1-27.

Example 29 is a method to implement of any of Examples 1-27.

In Example 30, the apparatuses or method of any one or any combination of Examples 1-29 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A docking station for a mobile cleaning robot, the docking station comprising:

a base portion comprising a front portion and a rear portion opposite the front portion, the base portion configured to receive the mobile cleaning robot;

a housing connected to the base portion located proximate to the rear portion away from the front portion; and a pad cleaning system connected to the housing, the pad cleaning system comprising:

a cleaning head to engage a cleaning pad of the mobile cleaning robot to remove debris from the cleaning pad, the cleaning head including a nozzle configured to discharge a fluid onto the cleaning pad;

charging contacts connected to the base portion and engageable with contacts of the mobile cleaning robot to deliver a charge thereto;

a contact sled connected to the charging contacts and translatable along the base portion in a path comprising forward displacement and backward displacement between the front portion and the rear portion of the base portion, wherein the charging contacts are adapted to translate relative to the contact sled in a path including an upward displacement and downward displacement between an extended position where the charging contacts extend upward through the base portion and a retracted position where the charging contacts are recessed below the base portion, respectively; and a pair of biasing elements located at least partially within the contact sled, the pair of biasing elements engageable with the charging contacts, respectively, to bias the charging contacts to extend upward through the base portion.

2. The docking station of claim 1, wherein the pad cleaning system includes a pump arranged to deliver a liquid to the cleaning pad.

3. The docking station of claim 2, wherein the cleaning head includes a plurality of nozzles connected to the pump.

4. The docking station of claim 2, further comprising:

a storage tank located at least partially within the housing, the storage tank arranged to store liquid for delivery to the pump.

5. The docking station of claim 4, further comprising:

a cleaning agent storage tank located at least partially within the housing, the cleaning agent storage tank arranged to store detergent for delivery to at least one of the storage tank or the pump.

6. The docking station of claim 5, wherein the pump is operable in a first mode to pump liquid from the storage tank and is operable in a second mode to pump detergent from the cleaning agent storage tank.

7. The docking station of claim 4, further comprising:

a heater connected to the storage tank to heat the liquid within the storage tank.

8. The docking station of claim 2, the pad cleaning system further comprising:

a tray located at least partially within the housing, the cleaning pad positionable over or in the tray, the tray arranged to receive the liquid therein.

9. The docking station of claim 1, further comprising:

an evacuation system located at least partially within the housing, the evacuation system operable to extract debris from a debris bin of the mobile cleaning robot.

10. The docking station of claim 1, further comprising:

a lever connected to the charging contact and movable to move the charging contact between the extended position and the retracted position.

11. The docking station of claim 1, further comprising:

an actuator connected to the contact sled and operable to cause the contact sled to translate with respect to the base portion in a linear path defined by the actuator between the front portion and the rear portion of the base portion.

12. A docking station for a mobile cleaning robot, the docking station comprising:

a base configured to receive the mobile cleaning robot, the base comprising a front portion and a rear portion opposite the front portion;

a housing connected to the base located proximate to the rear portion away from the front portion;

a pad cleaning system connected to the housing, the pad cleaning system comprising:

a cleaning head to engage a cleaning pad of the mobile cleaning robot to remove debris from the cleaning pad, the cleaning head including a nozzle configured to discharge a fluid onto the cleaning pad;

a sled coupled to the base and movable relative to the base in a path comprising forward displacement and backward displacement to move between an extended position proximate to the front portion of the base and a retracted position proximate to the rear portion of the base;

charging contacts connected to the sled and engageable with contacts of the mobile cleaning robot to deliver a charge thereto, the charging contacts adapted to translate relative to the sled in a path including an upward displacement and a downward displacement; and a pair of biasing elements located at least partially within the sled, the pair of biasing elements engageable with the charging contacts, respectively, to bias the charging contacts to extend upward through the base in the extended position of the sled.

13. The docking station of claim 12, further comprising:

an actuator connected to the sled and operable to cause the sled to translate with respect to the base in a linear path defined by the actuator between the extended position and the retracted position.

14. The docking station of claim 12, wherein the base includes a ramp angled with respect to a flooring surface, the charging contacts configured to extend at least partially through the ramp when the sled is in the extended position.

15. The docking station of claim 12, wherein the sled includes an opening, the charging contacts are adapted to extend upward through the opening in the extended position of the sled and recessed below the opening in the retracted position of the sled.

16. The docking station of claim 12, further comprising:

a lever located at least partially within the contact sled, the lever is engageable with the charging contact and movable to move the charging contact between the extended position and the retracted position proximate to the front portion and the rear portion of the base portion, respectively.

17. The docking station of claim 16, wherein the lever includes a bar configured to engage a ramp of the base causing the charging contacts, respectively, to move downward by compressing the pair of biasing elements in the retracted position of the sled.

18. The docking station of claim 12, wherein the pair of biasing elements is compression springs.

19. The docking station of claim 12, wherein the pair of biasing elements is coupled between the sled and the charging contacts.

* * * * *